United States Patent
Furusako et al.

(10) Patent No.: US 10,040,145 B2
(45) Date of Patent: Aug. 7, 2018

(54) SPOT WELDING METHOD OF HIGH-STRENGTH STEEL SHEETS EXCELLENT IN JOINT STRENGTH

(71) Applicant: NIPPON STEEL & SUMITOMO METAL CORPORATION, Tokyo (JP)

(72) Inventors: Seiji Furusako, Tokyo (JP); Hatsuhiko Oikawa, Tokyo (JP); Yasunobu Miyazaki, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 364 days.

(21) Appl. No.: 14/417,075

(22) PCT Filed: Sep. 24, 2012

(86) PCT No.: PCT/JP2012/074355
§ 371 (c)(1),
(2) Date: Jan. 23, 2015

(87) PCT Pub. No.: WO2014/045431
PCT Pub. Date: Mar. 27, 2014

(65) Prior Publication Data
US 2015/0174690 A1    Jun. 25, 2015

(51) Int. Cl.
*B23K 11/16* (2006.01)
*B23K 11/11* (2006.01)
(Continued)

(52) U.S. Cl.
CPC ............ *B23K 11/115* (2013.01); *B23K 11/16* (2013.01); *B23K 11/241* (2013.01); *B23K 2203/04* (2013.01)

(58) Field of Classification Search
CPC .............................................. B23K 2203/04
(Continued)

(56) References Cited

U.S. PATENT DOCUMENTS 5,484,975 A * 1/1996 Itatsu ................ B23K 11/24
219/86.7
5,906,755 A    5/1999 Arasuna et al.
(Continued)

FOREIGN PATENT DOCUMENTS

CN    102300667 A    12/2011
JP    10-58157 A    3/1998
(Continued)

OTHER PUBLICATIONS

Korean Office Action dated May 2, 2016, for Korean Application No. 10-2015-7002933.
(Continued)

*Primary Examiner* — David Angwin
*Assistant Examiner* — Spencer H Kirkwood
(74) *Attorney, Agent, or Firm* — Birch, Stewart, Kolasch & Birch, LLP

(57) ABSTRACT

When two high-strength steel sheets (1A, 1B) whose sheet thickness ratio={the sum of sheet thicknesses of the steel sheets}/{the sheet thickness of the thinner steel sheet (when they have the same thickness, the sheet thickness per one sheet)} is within a range of not less than 2 nor more than 5 and which both have tensile strength of not less than 780 MPa nor more than 1850 MPa are stacked to be subjected to resistance spot welding, a first welding step being pre-welding with a pressurizing force P1 kN and a welding current I1 kA and a second welding step being main welding with a pressurizing force P2 kN and a welding current I2 kA are performed, the pressurizing forces P1, P2 are set to a fixed pressurizing force P=P1=P2 all through the first welding step and the second welding step and are set within a range expressed by $\{0.5 \leq P \leq 3.0 t^{(1/3)}\}$, where t mm is an average sheet thickness of the steel sheets (1A, 1B), the welding current I1 is set within a range of not less than 30% nor more than 90% of the welding current I2, and the second welding step is started within 0.1 s after the first welding step is finished.

12 Claims, 11 Drawing Sheets

(51) Int. Cl.
*B23K 11/24* (2006.01)
*B23K 103/04* (2006.01)

(58) Field of Classification Search
USPC ........................................ 219/91.22
See application file for complete search history.

(56) References Cited

U.S. PATENT DOCUMENTS

| | | | |
|---|---|---|---|
| 6,232,572 B1* | 5/2001 | Kanjo | B23K 11/115 219/110 |
| 2010/0243616 A1* | 9/2010 | Goto | B23K 11/0026 219/117.1 |
| 2011/0180518 A1 | 7/2011 | Hasegawa et al. | |
| 2011/0272384 A1* | 11/2011 | Matsushita | B23K 11/115 219/91.2 |

FOREIGN PATENT DOCUMENTS

| | | |
|---|---|---|
| JP | 2006-43731 A | 2/2006 |
| JP | 2006-95572 A | 4/2006 |
| JP | 2009-190046 A | 8/2009 |
| JP | 2009-241086 A | 10/2009 |
| JP | 2009-241112 A | 10/2009 |
| JP | 2010-115706 A | 5/2010 |
| JP | 2010-149187 A | 7/2010 |
| JP | 2010-172946 A | 8/2010 |
| JP | 2010-207909 A | 9/2010 |
| JP | 2010-240739 A | 10/2010 |
| JP | 2010-240740 A | 10/2010 |
| JP | 2010-247215 A | 11/2010 |
| JP | 2011-67853 A | 4/2011 |
| JP | 2011-152574 A | 8/2011 |
| KR | 10-2011-0091592 A | 8/2011 |

OTHER PUBLICATIONS

International Search Report, dated Dec. 18, 2012, issued in PCT/JP2012/074355.
Written Opinion of the International Searching Authority, dated Dec. 18, 2012, issued in PCT/JP2012/074355.
Chinese Office Action dated Dec. 6, 2016 for CN Application No. CN2012800759800 (with English Translation).
International Preliminary Report on Patentability and Written Opinion of the International Searching Authority (forms PCT/IB/338, PCT/IB/373 and PCT/ISA/237), dated Apr. 2, 2015, for counterpart International Application No. PCT/JP2012/074355, with an English translation of the Written Opinion.

* cited by examiner

F I G. 1
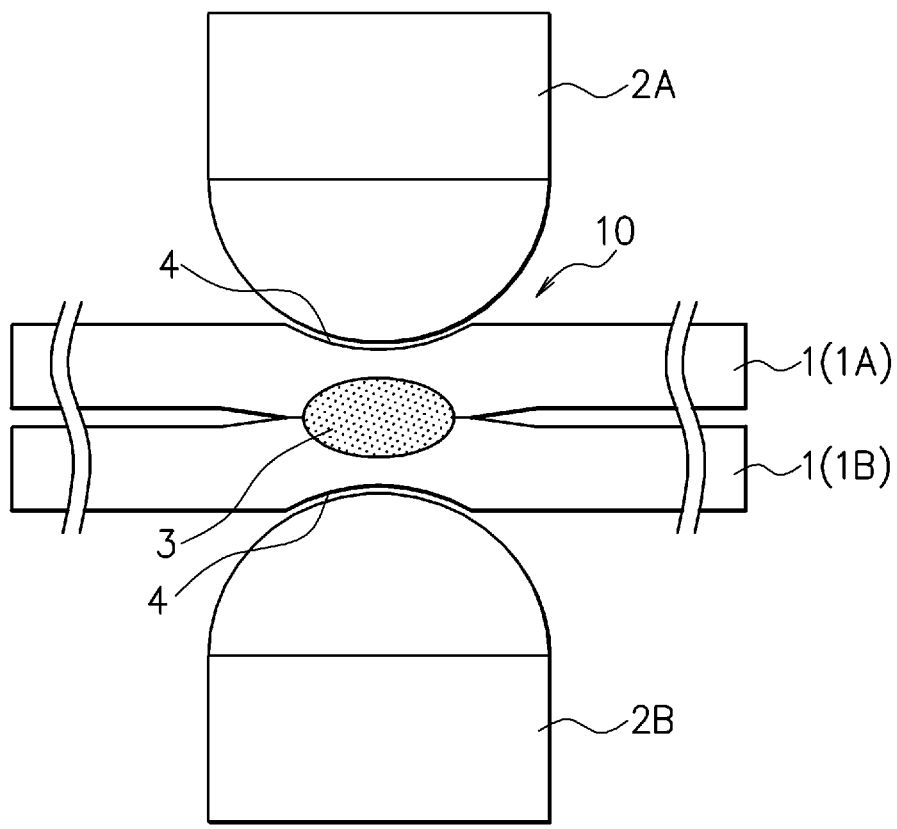

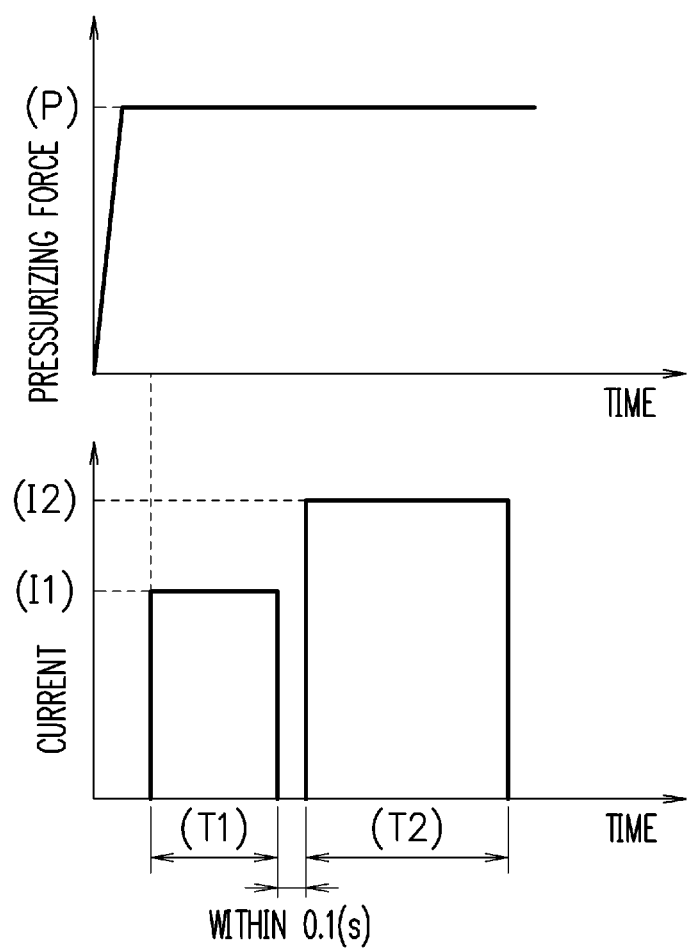
F I G. 3

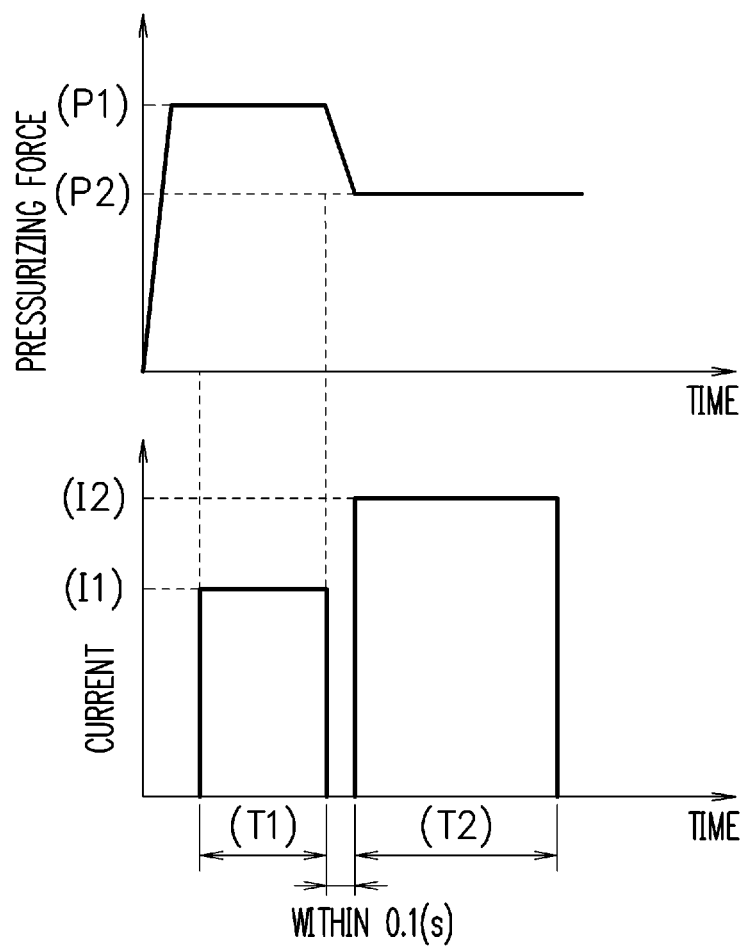
F I G. 4

FIG. 7

| CONDITION | STEEL TYPE FIRST SHEET | STEEL TYPE SECOND SHEET | STEEL TYPE | SHEET THICKNESS (t) | | | TENSILE STRENGTH FIRST SHEET (MPa) | TENSILE STRENGTH SECOND SHEET (MPa) | TENSILE STRENGTH THIRD SHEET (MPa) | REQUIREMENT OF EXPRESSION (1) | | ACTUAL PRESSURIZING FORCE (P) P1=P2 (kN) | FIRST WELDING (PRE-WELDING) | | SECOND WELDING (MAIN WELDING) | | CURRENT RATIO I1/I2 | DEPTH OF INDENTATION (mm) | NUGGENT DIAMETER (mm) | CTS (kN) | NOTE |
|---|---|---|---|---|---|---|---|---|---|---|---|---|---|---|---|---|---|---|---|---|---|
| | | | | FIRST SHEET (mm) | SECOND SHEET (mm) | THIRD SHEET (mm) | | | | LOWEST PRESSURIZING FORCE (kN) | HIGHEST PRESSURIZING FORCE (kN) | | CURRENT (I1) (kA) | TIME (T1) (s) | CURRENT (I2) (kA) | TIME (T2) (s) | | | | | |
| 1 | CR1470HP | CR1470HP | – | 1 | 1 | NONE | 1488 | 1488 | – | 0.5 | 3 | 0.4 | 5 | 0.16 | 7.2 | 0.2 | 0.69 | 0.4 | 3.1 | 2.1 | COMPARATIVE EXAMPLE |
| 2 | CR1470HP | CR1470HP | – | 1 | 1 | NONE | 1488 | 1488 | – | 0.5 | 3 | 1.5 | 5 | 0.16 | 7.2 | 0.2 | 0.69 | 0.1 | 5.2 | 5.3 | PRESENT INVENTION EXAMPLE |
| 3 | CR1470HP | CR1470HP | – | 1 | 1 | NONE | 1488 | 1488 | – | 0.5 | 3 | 2.5 | 5 | 0.16 | 7.2 | 0.2 | 0.69 | 0.1 | 5.2 | 5.4 | PRESENT INVENTION EXAMPLE |
| 4 | CR1470HP | CR1470HP | CR1470HP | 1 | 1 | 1 | 1488 | 1488 | 1488 | 1.5 | 3 | 3.0 | 5 | 0.16 | 7.6 | 0.2 | 0.66 | 0.2 | 5.5 | 5.3 | PRESENT INVENTION EXAMPLE |
| 5 | CR1470HP | CR1470HP | – | 1 | 1 | NONE | 1488 | 1488 | – | 0.5 | 3 | 4 | 5 | 0.16 | 7.8 | 0.2 | 0.64 | 0.3 | 5.3 | 3.5 | COMPARATIVE EXAMPLE |
| 6 | GA1180Y | GA1180Y | – | 2 | 2 | NONE | 1192 | 1192 | – | 0.5 | 3.8 | 0.4 | 6 | 0.16 | 8 | 0.3 | 0.75 | 0.3 | 5.5 | 7.0 | COMPARATIVE EXAMPLE |
| 7 | GA1180Y | GA1180Y | – | 2 | 2 | NONE | 1192 | 1192 | – | 0.5 | 3.8 | 3 | 6 | 0.16 | 8 | 0.3 | 0.75 | 0.1 | 6.8 | 12.0 | PRESENT INVENTION EXAMPLE |
| 8 | GA1180Y | GA1180Y | – | 2 | 2 | NONE | 1192 | 1192 | – | 0.5 | 3.8 | 5 | 6 | 0.16 | 8.8 | 0.3 | 0.68 | 0.3 | 6.7 | 6.2 | COMPARATIVE EXAMPLE |
| 9 | CR1780HP | CR1780HP | – | 1 | 1 | NONE | 1798 | 1798 | – | 0.5 | 3 | 2.5 | 2 | 0.16 | 7 | 0.2 | 0.29 | 0.3 | 4.4 | 4.1 | COMPARATIVE EXAMPLE |
| 10 | CR1780HP | CR1780HP | – | 1 | 1 | NONE | 1798 | 1798 | – | 0.5 | 3 | 2.5 | 6 | 0.16 | 7 | 0.2 | 0.86 | 0.1 | 5.3 | 6.5 | PRESENT INVENTION EXAMPLE |
| 11 | CR1780HP | CR1780HP | – | 1 | 1 | NONE | 1798 | 1798 | – | 0.5 | 3 | 2.5 | 0.5 | 0.16 | 7 | 0.2 | 1.21 | 0.3 | 4.9 | 4.2 | COMPARATIVE EXAMPLE |
| 12 | CR980Y | CR980Y | – | 0.7 | 0.7 | NONE | 1012 | 1012 | – | 0.5 | 2.7 | 0.4 | 6 | 0.16 | 7.0 | 0.2 | 0.86 | 0.3 | 3.3 | 2.0 | COMPARATIVE EXAMPLE |
| 13 | CR980Y | CR980Y | – | 0.7 | 0.7 | NONE | 1012 | 1012 | – | 0.5 | 2.7 | 2.5 | 6 | 0.16 | 7.6 | 0.3 | 0.86 | 0.1 | 4.2 | 4.3 | PRESENT INVENTION EXAMPLE |
| 14 | CR980Y | CR980Y | – | 0.7 | 0.7 | NONE | 1012 | 1012 | – | 0.5 | 2.7 | 3.5 | 6 | 0.16 | 7.6 | 0.3 | 0.79 | 0.2 | 4.4 | 1.9 | COMPARATIVE EXAMPLE |
| 15 | CR980Y | CR980Y | – | 0.7 | 4 | NONE | 1009 | 995 | – | 0.5 | 4.0 | 2.5 | 4 | 0.12 | 6.5 | 0.14 | 0.54 | – | – | – | COMPARATIVE (UNABLE TO JOIN) |
| 16 | CR980Y | CR980Y | CR1470HP | 1.6 | 1.6 | 0.7 | 1010 | 1010 | 283 | 0.5 | 3.3 | 0.3 | 5 | 0.16 | 6.0 | 0.25 | 0.63 | 0.3 | 5.2 | 6.8 | COMPARATIVE EXAMPLE |
| 17 | CR980Y | CR980Y | CR1470HP | 1.6 | 1.6 | 0.7 | 1010 | 1010 | 283 | 0.5 | 3.3 | 2.5 | 5 | 0.16 | 8.0 | 0.3 | 0.63 | 0.2 | 6.2 | 10.2 | PRESENT INVENTION EXAMPLE |
| 18 | CR980Y | CR980Y | CR1470HP | 1.6 | 1.6 | 0.7 | 1010 | 1010 | 283 | 0.5 | 3.3 | 5 | 5 | 0.16 | 8.6 | 0.3 | 0.58 | 0.3 | 6.4 | 7.3 | COMPARATIVE EXAMPLE |

FIG. 8

| CONDITION | STEEL TYPE FIRST SHEET | STEEL TYPE SECOND SHEET | STEEL TYPE | SHEET THICKNESS (t) FIRST SHEET (mm) | SHEET THICKNESS (t) SECOND SHEET (mm) | SHEET THICKNESS (t) THIRD SHEET (mm) | TENSILE STRENGTH FIRST SHEET (MPa) | TENSILE STRENGTH SECOND SHEET (MPa) | TENSILE STRENGTH THIRD SHEET (MPa) | GAP BETWEEN STEEL SHEETS (mm) | REQUIREMENT OF EXPRESSION (2) LOWEST PRESSURIZING FORCE (kN) | REQUIREMENT OF EXPRESSION (2) HIGHEST PRESSURIZING FORCE (kN) | ACTUAL PRESSURIZING FORCE (P) P1 (kN) | ACTUAL PRESSURIZING FORCE (P) P2 (kN) | PRESSURIZING FORCE RATIO P1/P2 | FIRST WELDING (PRE-WELDING) CURRENT (I1) (kA) | FIRST WELDING (PRE-WELDING) TIME (T1) (s) | SECOND WELDING (MAIN WELDING) CURRENT (I2) (kA) | SECOND WELDING (MAIN WELDING) TIME (T2) (s) | CURRENT RATIO I1/I2 | DEPTH OF INDENTATION (mm) | NUGGENT DIAMETER (mm) | CTS (kN) | NOTE |
|---|---|---|---|---|---|---|---|---|---|---|---|---|---|---|---|---|---|---|---|---|---|---|---|---|
| 21 | CR1470HP | CR1470HP | — | 1 | 1 | NONE | 1488 | 1488 | — | 0.8 | 0.5 | 3 | 2.5 | 2.5 | 1.0 | 5 | 0.16 | 7.2 | 0.2 | 0.69 | 0.3 | 3.2 | 2.4 | COMPARATIVE EXAMPLE |
| 22 | CR1470HP | CR1470HP | — | 1 | 1 | NONE | 1488 | 1488 | — | 0.8 | 0.5 | 3 | 3.5 | 2.5 | 1.4 | 5 | 0.16 | 7.2 | 0.2 | 0.69 | 0.1 | 5.3 | 5.5 | PRESENT INVENTION EXAMPLE |
| 23 | CR1470HP | CR1470HP | — | 1 | 1 | NONE | 1488 | 1488 | — | 0.8 | 0.5 | 3 | 6.0 | 2.5 | 2.4 | 5 | 0.16 | 7.2 | 0.2 | 0.69 | 0.2 | 4.7 | 4.2 | COMPARATIVE EXAMPLE |
| 24 | CR1470HP | CR1470HP | CR1470HP | 1 | 1 | 1 | 1488 | 1488 | 1488 | 1 | 1.5 | 3 | 3.0 | 3.0 | 1.0 | 5 | 0.16 | 7.2 | 0.2 | 0.69 | 0.4 | 3.0 | 3.6 | COMPARATIVE EXAMPLE |
| 25 | CR1470HP | CR1470HP | CR1470HP | 1 | 1 | 1 | 1488 | 1488 | 1488 | 1 | 1.5 | 3 | 4.5 | 3.0 | 1.5 | 5 | 0.16 | 7.2 | 0.2 | 0.69 | 0.2 | 5.5 | 5.7 | PRESENT INVENTION EXAMPLE |
| 26 | CR1470HP | CR1470HP | CR1470HP | 1 | 1 | 1 | 1488 | 1488 | 1488 | 1 | 1.5 | 3 | 6.5 | 3.0 | 2.2 | 5 | 0.16 | 7.2 | 0.2 | 0.69 | 0.4 | 4.3 | 3.7 | COMPARATIVE EXAMPLE |
| 27 | GA1180Y | GA1180Y | — | 2 | 2 | NONE | 1192 | 1192 | — | 1.2 | 0.5 | 3.8 | 3.0 | 3.0 | 1.0 | 6 | 0.16 | 8.0 | 0.3 | 0.75 | 0.4 | 3.7 | 5.5 | COMPARATIVE EXAMPLE |
| 28 | GA1180Y | GA1180Y | — | 2 | 2 | NONE | 1192 | 1192 | — | 1.2 | 0.5 | 3.8 | 3.5 | 3.0 | 1.2 | 6 | 0.16 | 8.0 | 0.3 | 0.75 | 0.1 | 6.8 | 12.1 | PRESENT INVENTION EXAMPLE |
| 29 | GA1180Y | GA1180Y | — | 2 | 2 | NONE | 1192 | 1192 | — | 1.2 | 0.5 | 3.8 | 8.0 | 3.0 | 2.7 | 6 | 0.16 | 8.0 | 0.3 | 0.75 | 0.4 | 5.0 | 7.5 | COMPARATIVE EXAMPLE |
| 30 | CR1780HP | CR1780HP | — | 1 | 1 | NONE | 1798 | 1798 | — | 0.8 | 0.5 | 3 | 2.5 | 2.5 | 1.0 | 5 | 0.16 | 7.0 | 0.2 | 0.71 | 0.4 | 3.9 | 4.1 | COMPARATIVE EXAMPLE |
| 31 | CR1780HP | CR1780HP | — | 1 | 1 | NONE | 1798 | 1798 | — | 0.8 | 0.5 | 3 | 3.0 | 2.5 | 1.2 | 5 | 0.16 | 7.0 | 0.2 | 0.71 | 0.1 | 5.3 | 6.5 | PRESENT INVENTION EXAMPLE |
| 32 | CR1780HP | CR1780HP | — | 1 | 1 | NONE | 1798 | 1798 | — | 0.8 | 0.5 | 3 | 5.5 | 2.5 | 2.2 | 5 | 0.16 | 7.0 | 0.2 | 0.71 | 0.3 | 5.3 | 4.8 | COMPARATIVE EXAMPLE |
| 33 | CR980Y | CR980Y | — | 0.7 | 0.7 | NONE | 1012 | 1012 | — | 0.7 | 0.5 | 2.7 | 2.5 | 2.5 | 1.0 | 6 | 0.16 | 8.5 | 0.3 | 0.71 | 0.2 | 3.9 | 1.9 | COMPARATIVE EXAMPLE |
| 34 | CR980Y | CR980Y | — | 0.7 | 0.7 | NONE | 1012 | 1012 | — | 0.7 | 0.5 | 2.7 | 2.5 | 2.5 | 1.0 | 6 | 0.16 | 8.5 | 0.3 | 0.71 | 0.1 | 4.2 | 4.3 | PRESENT INVENTION EXAMPLE |
| 35 | CR980Y | CR980Y | — | 0.7 | 0.7 | NONE | 1012 | 1012 | — | 0.7 | 0.5 | 2.7 | 6.0 | 2.5 | 2.4 | 6 | 0.16 | 8.5 | 0.3 | 0.71 | 0.3 | 3.5 | 1.7 | COMPARATIVE EXAMPLE |
| 36 | CR980Y | CR980Y | CR270D | 1.6 | 1.6 | 0.7 | 1010 | 1010 | 283 | 0.8 | 0.5 | 3.3 | 2.5 | 2.5 | 1.0 | 5 | 0.16 | 8.0 | 0.3 | 0.63 | 0.2 | 5.3 | 6.9 | COMPARATIVE EXAMPLE |
| 37 | CR980Y | CR980Y | CR270D | 1.6 | 1.6 | 0.7 | 1010 | 1010 | 283 | 0.8 | 0.5 | 3.3 | 3.0 | 2.5 | 1.2 | 5 | 0.16 | 8.0 | 0.3 | 0.63 | 0.1 | 6.3 | 10.4 | PRESENT INVENTION EXAMPLE |
| 38 | CR980Y | CR980Y | CR270D | 1.6 | 1.6 | 0.7 | 1010 | 1010 | 283 | 0.8 | 0.5 | 3.3 | 5.5 | 2.5 | 2.2 | 5 | 0.16 | 8.6 | 0.3 | 0.63 | 0.2 | 6.4 | 7.2 | COMPARATIVE EXAMPLE |

FIG. 9

| CONDITION | STEEL TYPE FIRST SHEET | STEEL TYPE SECOND SHEET | STEEL TYPE THIRD SHEET | SHEET THICKNESS (t) FIRST SHEET (mm) | SHEET THICKNESS (t) SECOND SHEET (mm) | SHEET THICKNESS (t) THIRD SHEET (mm) | TENSILE STRENGTH FIRST SHEET (MPa) | TENSILE STRENGTH SECOND SHEET (MPa) | TENSILE STRENGTH THIRD SHEET (MPa) | REQUIREMENT OF EXPRESSION (1) LOWEST PRESSURIZING FORCE (kN) | REQUIREMENT OF EXPRESSION (1) HIGHEST PRESSURIZING FORCE (kN) | ACTUAL PRESSURIZING FORCE (P) P1=P2 (kN) | FIRST WELDING (PRE-WELDING) CURRENT (I1) (kA) | FIRST WELDING (PRE-WELDING) TIME (T1) (s) | SECOND WELDING (MAIN WELDING) CURRENT (I2) (kA) | SECOND WELDING (MAIN WELDING) TIME (T2) (s) | CURRENT RATIO I1/I2 | NON-WELDING TIME (TC) (s) | THIRD WELDING (POST-WELDING) CURRENT (I3) (kA) | THIRD WELDING (POST-WELDING) TIME (T3) (s) | LEFT SIDE−RIGHT SIDE OF EXPRESSION (4) | DEPTH OF INDENTATION (mm) | NUGGENT DIAMETER (mm) | CTS (kN) | NOTE |
|---|---|---|---|---|---|---|---|---|---|---|---|---|---|---|---|---|---|---|---|---|---|---|---|---|---|
| 41 | CR1470HP | CR1470HP | − | 1 | 1 | NONE | 1488 | 1488 | − | 0.5 | 3 | 1.5 | 5 | 0.16 | 7.2 | 0.2 | 0.69 | 0.06 | 7 | 0.08 | −0.20 | 0.1 | 5.2 | 6.6 | PRESENT INVENTION EXAMPLE |
| 42 | CR1470HP | CR1470HP | − | 1 | 1 | NONE | 1488 | 1488 | − | 0.5 | 3 | 1.5 | 5 | 0.16 | 7.2 | 0.2 | 0.69 | 0.06 | 9 | 0.08 | −0.04 | 0.1 | 5.2 | 6.0 | PRESENT INVENTION EXAMPLE |
| 43 | CR1470HP | CR1470HP | − | 1 | 1 | NONE | 1488 | 1488 | − | 0.5 | 3 | 1.5 | 5 | 0.16 | 7.2 | 0.2 | 0.69 | 0.06 | 12 | 0.08 | 0.20 | 0.1 | 5.3 | 5.3 | COMPARATIVE EXAMPLE |
| 44 | CR1470HP | CR1470HP | − | 1 | 1 | NONE | 1488 | 1488 | − | 0.5 | 3 | 1.5 | 5 | 0.16 | 7.2 | 0.2 | 0.69 | 0.04 | 10 | 0.08 | 0.06 | 0.1 | 5.6 | 5.3 | COMPARATIVE EXAMPLE |
| 45 | CR1470HP | CR1470HP | − | 1 | 1 | NONE | 1488 | 1488 | − | 0.5 | 3 | 1.5 | 5 | 0.16 | 7.2 | 0.2 | 0.69 | 0.04 | 10 | 0.08 | −0.14 | 0.1 | 5.2 | 6.3 | PRESENT INVENTION EXAMPLE |
| 46 | CR1470HP | CR1470HP | CR1470HP | 1 | 1 | 1 | 1488 | 1488 | 1488 | 1.5 | 3 | 3.0 | 5 | 0.16 | 8.0 | 0.2 | 0.63 | 0.08 | 7 | 0.08 | −0.22 | 0.2 | 5.5 | 6.7 | PRESENT INVENTION EXAMPLE |
| 47 | CR1470HP | CR1470HP | CR1470HP | 1 | 1 | 1 | 1488 | 1488 | 1488 | 1.5 | 3 | 3.0 | 5 | 0.16 | 8.0 | 0.2 | 0.63 | 0.08 | 9 | 0.08 | −0.06 | 0.2 | 5.5 | 6.4 | PRESENT INVENTION EXAMPLE |
| 48 | CR1470HP | CR1470HP | CR1470HP | 1 | 1 | 1 | 1488 | 1488 | 1488 | 1.5 | 3 | 3.0 | 5 | 0.16 | 8.0 | 0.2 | 0.63 | 0.06 | 12 | 0.08 | 0.20 | 0.2 | 5.6 | 5.2 | COMPARATIVE EXAMPLE |
| 49 | CR1780HP | CR1780HP | CR1470HP | 1 | 1 | 1 | 1488 | 1488 | 1488 | 1.5 | 3 | 3.0 | 5 | 0.16 | 8.0 | 0.2 | 0.63 | 0.06 | 10 | 0.08 | 0.04 | 0.2 | 5.7 | 5.3 | COMPARATIVE EXAMPLE |

F I G. 10

| CONDITION | 51 | 52 | 53 | 54 | 55 | 56 | 57 | 58 | 59 |
|---|---|---|---|---|---|---|---|---|---|
| STEEL TYPE FIRST SHEET | CR1470HP | CR1470HP | CR1470HP | CR1470HP | CR1470HP | CR1470HP | CR1470HP | CR1470HP | CR1470HP |
| STEEL TYPE SECOND SHEET | CR1470HP | CR1470HP | CR1470HP | CR1470HP | CR1470HP | CR1470HP | CR1470HP | CR1470HP | CR1470HP |
| STEEL TYPE THIRD SHEET | – | – | – | – | – | CR1470HP | CR1470HP | CR1470HP | CR1470HP |
| SHEET THICKNESS (t) FIRST SHEET (mm) | 1 | 1 | 1 | 1 | 1 | 1 | 1 | 1 | 1 |
| SHEET THICKNESS (t) SECOND SHEET (mm) | 1 | 1 | 1 | 1 | 1 | 1 | 1 | 1 | 1 |
| SHEET THICKNESS (t) THIRD SHEET (mm) | NONE | NONE | NONE | NONE | NONE | 1 | 1 | 1 | 1 |
| TENSILE STRENGTH FIRST SHEET (MPa) | 1488 | 1488 | 1488 | 1488 | 1488 | 1488 | 1488 | 1488 | 1488 |
| TENSILE STRENGTH SECOND SHEET (MPa) | 1488 | 1488 | 1488 | 1488 | 1488 | 1488 | 1488 | 1488 | 1488 |
| TENSILE STRENGTH THIRD SHEET (MPa) | – | – | – | – | – | 1488 | 1488 | 1488 | 1488 |
| GAP BETWEEN STEEL SHEETS (mm) | 0.8 | 0.8 | 0.8 | 0.8 | 0.8 | 1 | 1 | 1 | 1 |
| REQUIREMENT OF EXPRESSION (2) LOWEST PRESSURIZING FORCE (kN) | 0.5 | 0.5 | 0.5 | 0.5 | 0.5 | 1.5 | 1.5 | 1.5 | 1.5 |
| REQUIREMENT OF EXPRESSION (2) HIGHEST PRESSURIZING FORCE (kN) | 3 | 3 | 3 | 3 | 3 | 3 | 3 | 3 | 3 |
| ACTUAL PRESSURIZING FORCE (P) P1 (kN) | 3.5 | 3.5 | 3.5 | 3.5 | 3.5 | 4.5 | 4.5 | 4.5 | 4.5 |
| ACTUAL PRESSURIZING FORCE (P) P2 (kN) | 2.5 | 2.5 | 2.5 | 2.5 | 2.5 | 3.0 | 3.0 | 3.0 | 3.0 |
| PRESSURIZING FORCE RATIO P1/P2 | 1.4 | 1.4 | 1.4 | 1.4 | 1.4 | 1.5 | 1.5 | 1.5 | 1.5 |
| FIRST WELDING (PRE-WELDING) CURRENT (I1) (kA) | 5 | 5 | 5 | 5 | 5 | 5 | 5 | 5 | 5 |
| FIRST WELDING (PRE-WELDING) TIME (T1) (s) | 0.16 | 0.16 | 0.16 | 0.16 | 0.16 | 0.16 | 0.16 | 0.16 | 0.16 |
| SECOND WELDING (MAIN WELDING) CURRENT (I2) (kA) | 7.2 | 7.2 | 7.2 | 7.2 | 7.2 | 7.2 | 7.2 | 7.2 | 7.2 |
| SECOND WELDING (MAIN WELDING) TIME (T2) (s) | 0.2 | 0.2 | 0.2 | 0.2 | 0.2 | 0.2 | 0.2 | 0.2 | 0.2 |
| CURRENT RATIO I1/I2 | 0.69 | 0.69 | 0.69 | 0.69 | 0.69 | 0.69 | 0.69 | 0.69 | 0.69 |
| NON-WELDING TIME (TC) (s) | 0.06 | 0.06 | 0.06 | 0.06 | 0.06 | 0.06 | 0.06 | 0.06 | 0.06 |
| THIRD WELDING (POST-WELDING) CURRENT (I3) (kA) | 7 | 9 | 13 | 10 | 10 | 7 | 9 | 12 | 10 |
| THIRD WELDING (POST-WELDING) TIME (T3) (s) | 0.08 | 0.08 | 0.08 | 0.08 | 0.08 | 0.08 | 0.08 | 0.08 | 0.08 |
| LEFT SIDE-RIGHT SIDE OF EXPRESSION (4) | -0.20 | -0.04 | 0.24 | 0.06 | -0.14 | -0.22 | -0.06 | 0.20 | 0.04 |
| DEPTH OF INDENTATION (mm) | 0.1 | 0.1 | 0.1 | 0.1 | 0.1 | 0.2 | 0.2 | 0.2 | 0.2 |
| NUGGENT DIAMETER (mm) | 5.3 | 5.3 | 5.4 | 5.5 | 5.3 | 5.5 | 5.5 | 5.6 | 5.6 |
| CTS (kN) | 6.7 | 6.5 | 5.5 | 5.6 | 6.5 | 6.7 | 6.4 | 5.3 | 5.4 |
| NOTE | PRESENT INVENTION EXAMPLE | PRESENT INVENTION EXAMPLE | COMPARATIVE EXAMPLE | COMPARATIVE EXAMPLE | PRESENT INVENTION EXAMPLE | PRESENT INVENTION EXAMPLE | PRESENT INVENTION EXAMPLE | COMPARATIVE EXAMPLE | COMPARATIVE EXAMPLE |

SPOT WELDING METHOD OF HIGH-STRENGTH STEEL SHEETS EXCELLENT IN JOINT STRENGTH

TECHNICAL FIELD

The present invention relates to a spot welding method of high-strength steel sheets excellent in joint strength, for forming a weld by spot welding in, for example, processes of manufacturing automobile parts, assembling a vehicle body, and so on.

BACKGROUND ART

In recent years, in an automobile field, there has been an increasing need for using high-strength steel sheets for a vehicle body, parts, and so on in order to reduce the weight of the vehicle body with the aim of improving fuel efficiency and reducing an emission of carbon dioxide gas ($CO_2$) and to improve collision safety. Meanwhile, in processes of assembling the vehicle body, attaching the parts, and so on, spot welding is mainly used.

As important properties of a joint formed by the spot welding (hereinafter, referred to as a spot-welded joint), tensile strength and fatigue strength can be cited, but what is important first is tensile strength. Tensile strength of the spot-welded joint includes tensile shear strength (TSS) measured under tensile loads applied in shear directions and cross tensile strength (CTS) measured under tensile loads applied in peeling directions.

Generally, as for tensile strength of the spot-welded joint, TSS and CTS with sufficiently high values can be obtained with a good fracture state and little variation of strength when there is no defect or crack in weld metal (nugget) and the weld metal has a good property. Further, as for tensile strength of the spot-welded joint, it is possible to improve CTS also by sufficiently securing its nugget diameter (joint area) and so on.

As a method of improving cross tensile strength of a spot-welded joint formed by spot welding of high-strength steel sheets, there has been proposed a spot welding method in which two-stage welding, two-stage welding including cooling in the middle, or three-stage welding is performed under predetermined conditions at the time of welding (for example, refer to Patent Literature 1).

Further, as a spot welding method that gives high joint strength in a short time, there has been proposed a method including: a main welding step of obtaining a nugget with a predetermined diameter; and a post-heating welding step of repeating suspension for predetermined cycles and short-time welding while sandwiching steel sheets with the same pressurizing force as that in the main welding step (for example, refer to Patent Literatures 2, 3).

Further, as a spot welding method that gives high joint strength, there has been proposed a method including: a first step of forming a nugget in main welding; a second step of cooling a weld while keeping steel sheets sandwiched by electrodes, after the end of the first step; and a third step of passing a higher welding current than that of the main welding within a range causing no expulsion for a short time, after the end of the second step (for example, refer to Patent Literature 4).

Further, as a spot welding method that stably gives high joint strength, there has been proposed a method in which resistance spot welding is performed as welding composed of three first, second, and third stages, the welding in the second stage is performed as welding with a higher pressurizing force, a lower current or the same current, and a longer welding time or the same welding time as compared with the welding in the first stage, and in the third stage, welding with a higher current than that of the second stage is repeated (for example, refer to Patent Literature 5).

Further, as a spot welding method that stably gives high joint strength, there has been proposed a method in which resistance spot welding is performed as welding composed of three first, second, and third stages, the welding in the second stage is performed as welding with a higher pressurizing force, a lower current or the same current, and a longer welding time or the same welding time as compared with the welding in the first stage, and in the third stage, welding with a higher pressurizing force and a higher current than those of the second stage is repeated (for example, refer to Patent Literature 6).

Here, spot welding of high-strength steel sheets whose tensile strength is 780 MPa or more especially has a problem that sufficient joint strength cannot be obtained because a stress concentrates on weld metal when dislocation (load) is applied to a weld and the weld metal is low in ductility and toughness. Further, the high-strength steel sheets are high in specific resistance because they contain many alloy elements, and therefore, even when the same welding current is passed therein as in the case of soft steel sheets, a heat generation amount is larger than in the case of the soft steel sheets. Further, due to their high strength, the high-strength steel sheets are more difficult to fit with electrodes than the soft steel sheets, and their contact area becomes small. In such a case, since a fusion diameter grows to a size equal to or more than a contact size between the electrodes and the steel sheets during the welding, the molten metal shoots out from an overlapping surface of the steel sheets and what is called expulsion occurs. The occurrence of such expulsion has a problem of causing reduction and variation of a size of the weld metal, that is, of a joint area, leading to deterioration also of joint strength. Further, in actual production, the fact itself that a proper current range with which a predetermined weld metal size is obtained without any occurrence of expulsion is narrow is also a problem. Therefore, in the spot welding of the high-strength steel sheets, there is generally adopted a method which increases the contact size (area) between the electrodes and the steel sheets to prevent the occurrence of expulsion by setting a pressurizing force by the electrodes high, and increases a proper current range, to thereby stably secure the joint area.

However, when the high-strength steel sheets are spot-welded while the pressurizing force of the electrodes is set high, concavities generally called indentations due to plastic deformation are generated on surfaces of the stacked high-strength steel sheets (refer to the indentations 4 in FIG. 1 and FIG. 2). The indentations (concavities) being thus too large cause a problem of lowering joint strength on the contrary even when a nugget (refer to the nugget 3 in FIG. 1 and FIG. 2) with a large diameter is obtained. Therefore, in the spot welding of the high-strength steel sheets, it has been considered to appropriately decrease the pressurizing force of the electrodes within a range enabling to obtain a predetermined joint area in order to suppress the generation of large indentations.

However, when the pressurizing force at the time of the welding is set low in order to suppress the generation of the indentations, the contact area between the electrodes and the steel sheets during an initial period of the welding reduces and a current density in a weld zone becomes high, so that expulsion is likely to occur. The expulsion is a phenomenon that part of the molten metal scatters out from the overlapping surface of the steel sheets at the time of the spot welding. The occurrence of this expulsion makes it difficult to secure the nugget diameter with a necessary size at the time of the spot welding, and sometimes promotes the generation of the indentations contrary to the intention. In such a case, there are problems that deterioration and variation of joint strength occur. Further, the expulsion sometimes adheres to the periphery of the weld zone, and when its removal is necessary, there is a problem that workability lowers.

Here, as a method to suppress the occurrence of the expulsion at the time of the spot welding, there has been proposed a method which adopts a welding pattern including a first step with a welding current, a second step of passing a welding current that is 20 to 90% of that in the first step, and a third step of further passing a welding current larger than that in the first step (for example, refer to Patent Literature 7).

Further, as a method to suppress the occurrence of the expulsion at the time of the spot welding, there has been proposed a method that adopts a welding pattern including a first step with a welding current, a second step where a welding current that is 20 to 90% of that in the first step is passed and a pressurizing force of electrodes is set larger than that in the first step, and a third step where a welding current and a pressurizing force of the electrodes are set larger than those in the first step (for example, refer to Patent Literature 8).

Further, as a method of spot-welding high-tension steel sheets whose sheet thickness is 1.8 mm or more and tensile strength is 580 MPa or more, there has been proposed a method in which a pressurizing force and a welding current value at the time of the spot welding are set according to conditions satisfying predetermined expressions, and the spot welding is performed while expulsion is generated (for example, refer to Patent Literature 9).

Further, as a method of resistance spot-welding a sheet assembly composed of two stacked thick sheets and a steel sheet with a small sheet thickness stacked on an upper surface of the two thick sheets, having sheet gaps between the steel sheets, and having a large sheet thickness ratio, there has been proposed a method in which, in an advance step, a high pressurizing force is applied to crush the sheet gaps and thereafter the pressurizing force is reduced, and in a main step, the welding is performed for a short time with a low pressurizing force and a high current in an initial period of the welding, and the welding is performed with a high pressurizing force in a latter period of the welding (for example, refer to Patent literature 10).

CITATION LIST

Patent Literature

Patent Literature 1: Japanese Laid-open Patent Publication No. 2009-241086
Patent Literature 2: Japanese Laid-open Patent Publication No. 2010-115706
Patent Literature 3: Japanese Laid-open Patent Publication No. 2010-149187
Patent Literature 4: Japanese Laid-open Patent Publication No. 2010-172946
Patent Literature 5: Japanese Laid-open Patent Publication No. 2010-240739
Patent Literature 6: Japanese Laid-open Patent Publication No. 2010-240740
Patent Literature 7: Japanese Laid-open Patent Publication No. 2010-207909
Patent Literature 8: Japanese Laid-open Patent Publication No. 2010-247215
Patent Literature 9: Japanese Laid-open Patent Publication No. 2009-190046
Patent Literature 10: Japanese Laid-open Patent Publication No. 2009-241112

SUMMARY OF INVENTION

Technical Problem

However, in any of the aforesaid methods, a technique to suppress the generation of a large indentation is not proposed at all. Further, when a condition to lower the pressurizing force of the electrodes is employed in these conventional arts in order to suppress the generation of the indentation, there has been a problem that the expulsion is more likely to occur. In such a case, reduction and variation of the joint area occur and further the generation of the indentation is promoted, and thus there has been a problem that deterioration and variation of joint strength occur.

On the other hand, increasing the pressurizing force of the electrodes in order to suppress the occurrence of the expulsion has a problem of generating a large indentation to reduce joint strength.

The present invention was made in consideration of the aforesaid problems, and has an object to provide a spot welding method of high-strength steel sheets excellent in joint strength, the method being capable of securing a nugget diameter and preventing the occurrence of expulsion while suppressing the generation of an indentation especially when high-strength steel sheets with high tensile strength are spot-welded.

Solution to Problem

As a result of studious studies for solving the aforesaid problems, the present inventors have found out that, especially when high-strength steel sheets whose tensile strength is not less than 780 MPa nor more than 1850 MPa (hereinafter, written as 780 to 1850 MPa) are welded by a resistance spot welding method, by first setting a pressurizing force of electrodes to a proper range according to a sheet thickness of the steel sheets and further by setting a welding pattern to a proper range, it is possible to secure a nugget diameter and prevent the occurrence of expulsion while suppressing the generation of an indentation. That is, it has been found out that it is possible to obtain a spot-welded joint excellent in joint strength while maintaining good workability, by optimally controlling the welding pattern including pre-welding and main welding and the pressurizing force of the electrodes, and the present invention has been completed.

Specifically, the gists of the present invention are as follows.

[1] A spot welding method of high-strength steel sheets excellent in joint strength, the method applying resistance spot welding to a stack of a plurality of steel sheets, wherein the plural steel sheets are two steel sheets which both have tensile strength of not less than 780 MPa nor more than 1850 MPa and whose sheet thickness ratio={a sum of sheet thicknesses of the steel sheets}/{the sheet thickness of the thinner steel sheet (when the both have the same thickness, the sheet thickness per one sheet)} is within a range of not less than 2 nor more than 5, or are three steel sheets which are three steel sheets all having tensile strength of not less than 780 MPa nor more than 1850 MPa or which are two steel sheets both having tensile strength of not less than 780 MPa nor more than 1850 MPa and one steel sheet provided on an outer side of the two steel sheets and having tensile strength of less than 780 MPa, and whose sheet thickness ratio={a sum of sheet thicknesses of the steel sheets}/{the sheet thickness of the thinner steel sheet (when the steel sheets all have the same thickness, the sheet thickness per one sheet)} is within a range of not less than 3 nor more than 6, wherein the spot welding includes: a first welding step being pre-welding with a pressurizing force P1 (kN) and a welding current I1 (kA); and a second welding step being main welding with a pressurizing force P2 (kN) and a welding current I2 (kA), wherein the pressurizing forces P1, P2 are set to a fixed pressurizing force P=P1=P2 all through the first welding step and the second welding step, and are set within a range expressed by the following expression (1), where t (mm) is an average sheet thickness of the plural steel sheets, $$0.5 \le P \le 3.0 t^{(1/3)} \quad (1),$$

wherein the welding current I1 is set within a range of not less than 30% nor more than 90% of the welding current I2, and wherein the second welding step is started within 0.1 (s) after the first welding step is finished.

[2] A spot welding method of high-strength steel sheets excellent in joint strength, the method applying resistance spot welding to a stack of a plurality of steel sheets, wherein the plural steel sheets are two steel sheets which both have tensile strength of not less than 780 MPa nor more than 1850 MPa and whose sheet thickness ratio={a sum of sheet thicknesses of the steel sheets}/{the sheet thickness of the thinner steel sheet (when the both have the same thickness, the sheet thickness per one sheet)} is within a range of not less than 2 nor more than 5, or are three steel sheets which are three steel sheets all having tensile strength of not less than 780 MPa nor more than 1850 MPa or which are two steel sheets both having tensile strength of not less than 780 MPa nor more than 1850 MPa and one steel sheet provided on an outer side of the two steel sheets and having tensile strength of less than 780 MPa, and whose sheet thickness ratio={a sum of sheet thicknesses of the steel sheets}/{the sheet thickness of the thinner steel sheet (when the steel sheets all have the same thickness, the sheet thickness per one sheet)} is within a range of not less than 3 nor more than 6, wherein the spot welding includes: a first welding step being pre-welding with a pressurizing force P1 (kN) and a welding current I1 (kA); and a second welding step being main welding with a pressurizing force P2 (kN) and a welding current I2 (kA), wherein the pressurizing forces P1, P2 are set within ranges expressed by the following expression (2), expression (3), where t (mm) is an average sheet thickness of the plural steel sheets, $$0.5 \le P2 \le 3.0 t^{(1/3)} \quad (2)$$

$$1.0 \times P2 < P1 \le 2.0 \times P2 \quad (3)$$

wherein the welding current I1 is set within a range of not less than 30% nor more than 90% of the welding current I2, and wherein the second welding step is started within 0.1 (s) after the first welding step is finished.

[3] The spot welding method of the high-strength steel sheets excellent in joint strength according to [1], wherein any gap between the stacked steel sheets before the spot welding is less than 0.5 (mm).

[4] The spot welding method of the high-strength steel sheets excellent in joint strength according to [2], wherein at least one of gaps between the stacked steel sheets before the spot welding is 0.5 (mm) or more.

[5] The spot welding method of the high-strength steel sheets excellent in joint strength according to [1] or [2], the method including a third welding step being post welding after the second welding step being the main welding, wherein, with a welding current and a welding time of the third welding step being represented by I3 (kA) and T3 (s) respectively, and with a non-welding time between the second welding step and the third welding step being represented by TC (s), the welding current I3 is set within a range of not less than 3 (kA) nor more than 15 (kA), the non-welding time TC is within a range of not less than 0 (s) nor more than 0.2 (s), and a relation between the welding current I3 and the welding time T3 is set within a range expressed by the following expression (4).

$$I3 \times T3 \le 0.7 + TC \quad (4)$$

Advantageous Effects of Invention

According to the present invention, when the high-strength steel sheets are welded by the spot welding method, by setting the pressurizing forces of the electrodes within the proper range(s) according to the sheet thickness of the steel sheets and optimally controlling the welding pattern including the pre-welding and the main welding, it is possible to secure the nugget diameter and also prevent the occurrence of expulsion while suppressing the generation of an indentation. Consequently, it is possible to form a spot-welded joint high in reliability and excellent in joint strength while maintaining good workability. Therefore, for example, in processes of manufacturing automobile parts, assembling a vehicle body, and so on, it is possible to fully enjoy merits such as fuel efficiency improvement and an emission reduction of carbon dioxide gas ($CO_2$) owing to a weight reduction of the whole vehicle body, and their social contribution is immeasurable.

BRIEF DESCRIPTION OF DRAWINGS

FIG. 1 is a cross-sectional view illustrating a state where a weld metal zone is formed by a resistance spot welding method in a case where two high-strength steel sheets are stacked.

FIG. 3 is a graph illustrating an example of a pressurizing force and a welding pattern when a weld metal zone is formed by a resistance spot welding method in a first embodiment.

FIG. 4 is a graph illustrating an example of a pressurizing force and a welding pattern when a weld metal zone is formed by a resistance spot welding method in a second embodiment.

FIG. 7 is a chart presenting a list of fabrication conditions and test results of test pieces in an example 1.

FIG. 8 is a chart presenting a list of fabrication conditions and test results of test pieces in an example 2.

FIG. 9 is a chart presenting a list of fabrication conditions and test results of test pieces in an example 3.

FIG. 10 is a chart presenting a list of fabrication conditions and test results of test pieces in an example 4.

DESCRIPTION OF EMBODIMENTS

Hereinafter, a spot welding method of high-strength steel sheets according to the present invention will be described with reference to FIG. 1 to FIG. 6 when necessary, taking first to third embodiments as examples. In the present invention, the high-strength steel sheet refers to one whose tensile strength is 780 to 1850 MPa. Note that the embodiments are described in detail for better understanding of the spirit of the present invention and therefore are not intended to limit the present invention unless otherwise mentioned.

[Resistance Spot Welding Method]

Figure 2:
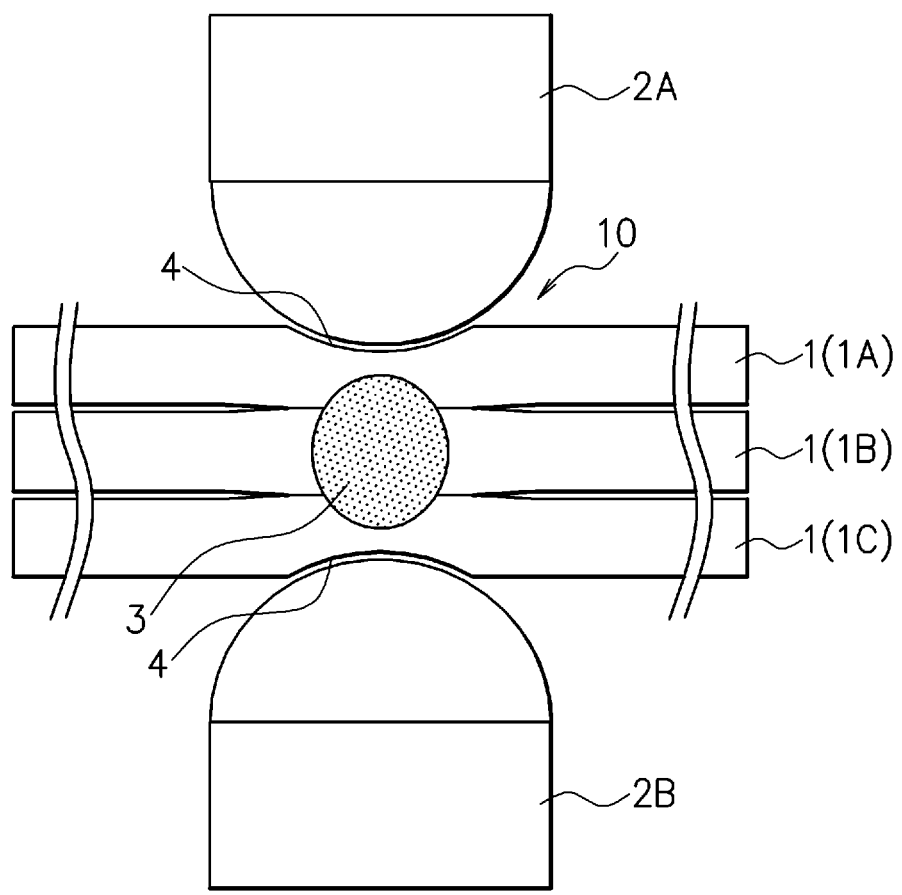
FIG. 2 is a cross-sectional view illustrating a state where a weld metal zone is formed by a resistance spot welding method in a case where three steel sheets including high-strength steel sheets are stacked.

FIG. 1 and FIG. 2 are explanatory schematic views of a resistance spot welding method used for welding steel sheets 1.

As illustrated in FIG. 1, first, two steel sheets 1A, 1B being materials to be welded are stacked. The two steel sheets 1A, 1B are both high-strength steel sheets. Then, a current is passed to an overlapping part of the steel sheets 1A, 1B while electrodes 2A, 2B each made of a copper alloy are pressed against the steel sheets 1A, 1B from both sides, that is, so as to sandwich them from up and down directions as illustrated in FIG. 1, whereby a molten metal zone is formed between the two steel sheets 1A, 1B. After the welding is finished, this molten metal zone is rapidly cooled to coagulate by heat removal by the water-cooled electrodes 2A, 2B and heat transfer to the steel sheets 1A, 1B, and a nugget (weld metal zone) 3 having an elliptical cross sectional shape is formed between the two steel sheets 1A, 1B. The formation of such a nugget results in the welding of the two steel sheets 1A, 1B.

Alternatively, as illustrated in FIG. 2, three steel sheets 1A, 1B, 1C are stacked and a current is passed while the electrodes 2A, 2B are pressed similarly to the above, so that a nugget (molten metal zone) 3 is formed among the three steel sheets 1A to 1C, resulting in the welding of the three steel sheets 1A to 1C. The three steel sheets 1A, 1B, 1C are all high-strength steel sheets, or two of them are high-strength steel sheets and the outer one (steel sheet 1A) is a low-strength steel sheet (tensile strength less than 780 MPa).

Note that, in the description below, the steel sheets 1A to 1C are sometimes referred to simply as the steel sheets 1 for convenience' sake.

In the welding by the resistance spot welding described above, pressurizing forces by the electrodes 2A, 2B and a welding pattern of pre-welding to main welding and in addition post-welding are stipulated within proper ranges as described below. Consequently, it is possible to prevent the occurrence of expulsion while suppressing the generation of an indentation, enabling to form a highly reliable weld having sufficiently high strength with good workability.

First Embodiment

Hereinafter, a first embodiment of the spot welding method of the high-strength steel sheets according to the present invention will be described. The spot welding method of the high-strength steel sheets of the first embodiment is a method of welding two steel sheets 1A, 1B or three steel sheets 1A to 1C by resistance spot welding in order to obtain a spot-welded joint 1C illustrated in FIG. 1 and FIG. 2.

Concretely, when the two steel sheets 1A, 1B are spot-welded as illustrated in FIG. 1, these two steel sheets 1A, 1B both have tensile strength of 780 to 1850 MPa. Further, a sheet thickness ratio={the sum of sheet thicknesses of the steel sheets}/{the sheet thickness of the thinner steel sheet (when the both have the same thickness, the sheet thickness per one sheet)} is within a range of not less than 2 nor more than 5.

When the three steel sheets 1A to 1C are spot-welded as illustrated in FIG. 2, these three steel sheets 1A to 1C all have tensile strength of 780 to 1850 MPa, or the two sheets both have tensile strength of 780 to 1850 MPa and the outer one sheet has tensile strength of less than 780 MPa. A sheet thickness ratio={the sum of sheet thicknesses of the steel sheets}/{the sheet thickness of the thinner steel sheet (when they all have the same thickness, the sheet thickness per one sheet)} is within a range of not less than 3 nor more than 6.

The first embodiment assumes a case where any gap in the stacked steel sheets 1 before the spot welding (hereinafter, referred to simply as the gap) is less than 0.5 (mm).

In the first embodiment, the spot welding includes: a first welding step being pre-welding with a pressurizing force P1 (kN) and a welding current I1 (kA); and a second welding step being main welding with a pressurizing force P2 (kN) and a welding current I2 (kA).

The pressurizing forces P1, P2 are set to a fixed pressurizing force P=P1=P2 all through the first welding step and the second welding step, and are set within a range expressed by the following expression (1), where t (mm) is an average sheet thickness of the plural steel sheets 1.

$$0.5 \leq P \leq 3.0 t^{(1/3)} \quad (1)$$

Further, the welding current I1 is set within a range of not less than 30% nor more than 90% (hereinafter, written as 30 to 90%) of the welding current I2.

Further, the second welding step is started within 0.1 (s) after the first welding step is finished.

"Reasons for Limiting Properties of Steel Sheets"

Hereinafter, reasons for limiting the properties of the steel sheets 1 (the high-strength steel sheets 1A, 1B illustrated in FIG. 1 or the steel sheets 1A to 1C illustrated in FIG. 2) being objects to be welded will be described in detail.

(Tensile Strength: 750 to 1850 MPa)

The steel sheets 1 being the objects to be welded include two high-strength steel sheets or more each having tensile strength of 780 to 1850 MPa.

The strength of the steel sheets has a great influence on a stress concentration state on a weld, and thus has an influence also on fracture state deterioration and accompanying strength variation and strength deterioration. When tensile strength of the steel sheets is less than 780 MPa, these problems are difficult to occur, and when it is over 1850 MPa, it becomes difficult to make improvements for preventing the deterioration and variation of joint strength.

As described above, the case where the high-strength steel sheets having tensile strength within the range of 780 to 1850 MPa and capable of realizing a weight reduction and improvement of collision safety is a target. A basic property of such steel sheets for ensuring both strength and moldability is high strength and in some cases, a high carbon equivalent. However, as a result, hard martensite is formed in a weld metal zone and a heat-affected zone. If the heat-affected zone around the weld metal zone is hard and further strength of base metal is high, the deformation of the heat-affected zone and the base metal around it is difficult to occur, and accordingly a stress concentration on the weld metal zone is likely to occur. Since such a case has a problem of causing fracture state deterioration, variation and deterioration of strength, and so on of the spot-welded joint, it is necessary to solve these problems in the practical application.

Therefore, the properties of the steel sheets are first stipulated to conditions described below, and then the spot welding is performed under various welding conditions which will be described in detail later. Consequently, even when the high-strength steel sheets are spot-welded, it is possible to obtain a good fracture state of the spot-welded joint and prevent variation and deterioration of strength while suppressing the occurrence of an indentation, enabling to form a highly reliable weld.

(Steel Type)

A steel type of the steel sheets 1 being the objects to be welded is not particularly limited, and for example, the steel sheets 1 may be of any type such as a two-phase structure type (for example, a structure containing martensite in ferrite, a structure containing bainite in ferrite, or the like), a strain-induced transformation type (a structure containing residual austenite in ferrite), a hardened type (martensite structure), or a microcrystalline type (structure essentially made of ferrite). Even when the high-strength steel sheets are of any of the steel types, applying the present invention makes it possible to weld the high-strength steel sheets without impairing the properties of the steel sheets while suppressing the generation of an indentation and suppressing the occurrence of expulsion at the time of the spot welding. Consequently, a highly reliable spot-welded joint (weld) with a good fracture state and with less variation and deterioration of strength can be obtained.

Further, the combination of the steel sheets is not limited to the combination of the steel sheets of the same type and with the same thickness, but the combination of the steel sheets of the same type and with different thicknesses, of different types and with the same thickness, or of different types and and with different thicknesses can be welded, provided that the steel sheets satisfy the stipulations, and further, besides the combination of the two stacked sheets illustrated in FIG. 1, the three stacked sheets may be combined as illustrated in FIG. 2.

(Plating)

Plating layers applied on surface layers of the steel sheets 1 being the objects to be welded may be plating layers of any kind such as, for example, a Zn-based one, a Zn—Fe-based one, a Zn—Ni-based one, a Zn—Al-based one, a Zn—Mg-based one, a Pb—Sn-based one, a Sn—Zn-based one, or a Al—Si-based one. Further, inorganic or organic coatings (for example, lubricating coatings or the like) may be applied on surface layers of the plating layers. Further, a weight of any of these plating layers is not particularly limited, but the weight on both surfaces is preferably 100 ($g/m^2$)/100 $g/m^2$) or less. When the weight of the plating per one surface is over 100 ($g/m^2$), the plating layers may obstruct the welding.

(Sheet Thickness)

The sheet thickness of each of the steel sheets 1 being the objects to be welded is not particularly limited, and if the steel sheet has an ordinary sheet thickness, for example, about 0.6 to 3.2 (mm) generally used in the field of an automobile vehicle body and the like, the aforesaid effects can be stably obtained by applying the present invention. However, since the stress concentration on the weld increases as the sheet thickness increases, the sheet thickness of each of the steel sheets 1 is more preferably within a 0.6 to 2.0 (mm) range.

"Reasons for Limiting Welding Conditions"

Hereinafter, reasons for limiting the welding conditions at the time of the resistance spot welding will be described in detail.

First, a welding pattern to be described later, at the time of the resistance spot welding of the steel sheets 1 is illustrated in the graph in FIG. 3. The welding pattern illustrated in FIG. 3 is an example of a welding pattern applicable to the spot welding method of the present invention. Note that, in the graph illustrated in FIG. 3, the vertical axis represents the welding currents I1, I2 or the pressurizing force P and the horizontal axis represents time T.

The main welding by the second welding step is performed within 0.1 (s) after the pre-welding is performed in the first welding step. That is, in this pattern, after the first welding step, the second welding step is immediately performed or the second welding step is performed after a welding suspension time within 0.1 (s). At this time, the welding current I1 of the first welding step is set to a lower current than the welding current I2 of the second welding step. Here, in a case of an alternating-current power source, the current indicates its effective value.

Further, the pressurizing force P by the electrodes 2A, 2B is fixed all through the first welding step and the second welding step, and further, the pressurized state is kept also in the welding suspension time between the first welding step and the second welding step.

Conventionally, when steel sheets are welded by an ordinary spot welding method, a welding pattern presents a roughly rectangular current waveform, that is, a current is shut off after a fixed current (I) is passed for welding for a predetermined time (T), and the pressurizing force P is also fixed during this period, though detailed illustration of this is omitted. On the other hand, the first embodiment adopts the welding pattern illustrated in FIG. 3 in which, prior to the second welding step being the main welding, the first welding step being the pre-welding is provided as described above. Here, a rising pattern of the welding current I1 when the first welding step is started may be a pattern in which it is increased vertically up to the set welding current I1 as illustrated in the graph in FIG. 3, or may be an up-slope pattern (stepwise pattern in which the current is gradually increased).

(Pressurizing Force of Electrodes to High-strength Steel Sheets: P)

The pressurizing force P (kN) of the electrodes 2A, 2B to the steel sheets 1 at the time of the welding in the first welding step and the second welding step is stipulated within the range expressed by the following expression (1).

$$0.5 \leq P \leq 3.0 t^{(1/3)} \quad (1)$$

In the above expression (1), P is the pressurizing force (kN) by the electrodes 2A, 2B, and t is an average sheet thickness (mm) of the steel sheets 1.

The pressurizing force P of the electrodes 2A, 2B has a great influence not only on strength, especially a change of strength in a peeling direction, of a weld accompanying the generation of an indentation but also on the occurrence of a defect or a crack in weld metal (nugget), and so on. Therefore, as expressed by the above expression (1), an upper limit of the pressurizing force P is first limited as above based on the average sheet thickness t of the plural steel sheets 1 so as to prevent the pressurizing force from becoming too high, whereby the generation of the indentations on the surfaces of the steel sheets 1 is suppressed. On the other hand, when the pressurizing force P is too low, expulsion is liable to occur at the time of the spot welding, and therefore, a lower limit of the pressurizing force P with which the occurrence of the expulsion can be suppressed is set to 0.5 (kN).

On the other hand, when the pressurizing force P is over the upper limit of the above range, there is a problem that the surfaces of the steel sheets 1 are dented by the electrodes 2A, 2B to cause the generation of large indentations, which lowers joint strength and impairs the outer appearance. Further, when the pressurizing force P is lower than the lower limit of the above range, a contact area becomes small and a current density becomes high, so that expulsion is likely to occur to cause a reduction and variation of a nugget size (joint area), and accordingly deterioration and variation of joint strength occur.

In the first embodiment, the pressurizing force P by the electrodes 2A, 2B is set within the aforesaid range, and thus is stipulated within a lower range than that of an ordinary pressurizing force. Further, the pattern is adopted in which, by executing the first welding step (pre-welding) before the second welding step (main welding), the electrodes 2A, 2B are made to fit with the steel sheets 1 and the steel sheets 1 are made to fit with each other with the low welding current while the occurrence of expulsion is suppressed, and thereafter the main welding by the second welding step is performed, which will be described in detail later.

(Welding Currents: I1, I2)

The welding current I1 (kA) in the first welding step being the pre-welding is stipulated within the range of 30 to 90% of the welding current I2 (kA) in the second welding step being the main welding.

As described above, by limiting the upper limit of the pressurizing force P based on the average sheet thickness t of the steel sheets 1, it is possible to suppress the generation of large indentations on the surfaces of the steel sheets 1, but on the other hand, there is a problem that the current density becomes high due to the reduction of the contact area, and accordingly expulsion is likely to occur. Therefore, the welding pattern is set to the pattern divided into the first welding step being the pre-welding and the second welding step being the main welding, and the welding current I1 in the first welding step is set lower than the welding current I2 in the second welding step. By thus performing the pre-welding by the first welding step first, an excessive increase of the current density is suppressed to prevent the occurrence of expulsion even when the initial contact area is small, and in addition, the electrodes 2A, 2B fit with the steel sheets 1 and the steel sheets 1 fit with each other.

Further, by performing the second welding step with the higher welding current I2 than that of the first welding step to sufficiently melt the base metal, it is possible to secure a sufficient joint area. By the pre-welding with the lower current by the first welding step, the electrodes 2A, 2B get to fit with the steel sheets 1 and the steel sheets 1 get to fit with each other, and the contact area is sufficiently secured, which makes it possible to suppress the occurrence of expulsion also in the second welding step.

When the welding current I1 in the first welding step is less than 30% of the welding current I2 in the second welding step, it is difficult to obtain the effect of making the electrodes 2A, 2B fit with the steel sheets 1 and making the steel sheets 1 fit with each other by the pre-welding. Further, when the welding current I1 in the first welding step is over 90% of the welding current I2 in the second welding step, the current density in a joint portion becomes high, which is liable to cause the occurrence of expulsion.

(Welding Suspension Time)

The second welding step being the main welding is started within 0.1 (s) after the first welding step being the pre-welding is finished. That is, the pattern can be such that, after the first welding step, the second welding step is immediately performed or the second welding step is performed after the welding suspension time within 0.1 (s).

When the welding suspension time up to the start of the second welding step after the first welding step is finished is over 0.1 (s), a preheating effect by the pre-welding in the first welding step is lost. This necessitates a need for increasing the welding current I2 in the second welding step, leading to inefficient current supply and lower productivity due to the elongated process time. Therefore, the shorter the suspension time, the more preferable, and more preferably, there is no suspension time between the first welding step and the second welding step.

Here, the upper limit 0.1 (s) of the welding suspension time is a 5-cycle (0.1 (s)) suspension time when, for example, a 50 Hz commercial power source is used as a power source of a welder, and is a 6-cycle (0.1 (s)) suspension time when a 60 Hz commercial power source is used.

Note that, though the method in which the second welding step is started immediately after the first welding step or the aforesaid welding suspension time for 0.1 (s) is provided is described, this is not restrictive. For example, an up-slope pattern is also possible in which the current is gradually increased between the first welding step and the second welding step.

(Other Welding Conditions)

Concrete numerical values of the welding currents, the welding time, and so on are not particularly limited, and they may be about equal to current values and welding time which have been conventionally adopted in a resistance spot welding method of welding steel sheets.

Further, for example, a conventionally known resistance spot welding facility provided with the electrodes 2A, 2B exemplified in FIG. 1 can be adopted without any limitation. Further, as the electrodes 2A, 2B and so on, those having conventionally used structures may be used. Furthermore, a power source which supplies the current to the electrodes 2A, 2B may be an alternating-current power source, or besides, a direct-current inverter or an alternating-current inverter. Further, the size and shape of the electrodes 2A, 2B are not particularly limited, but in order to properly obtain a contact pressure at electrode tips, the electrodes whose tip diameter is about 6 to 8 (mm) are preferably used.

According to the first embodiment, as described above, when any of the gaps between the steel sheets 1 is less than 0.5 (mm), the pressurizing force P of the electrodes 2A, 2B is set according to the average thickness t of the steel sheets 1, and further there is provided the first welding step in which the pre-welding is performed with the lower welding current I1 than the welding current I2 of the second welding step being the main welding. At this time, by setting the pressurizing force P to a pressurizing force that is not too high, it is possible to suppress the generation of indentations in the steel sheets 1, and by property setting the lower limit of the pressuring force P, it is possible to prevent the occurrence of expulsion. Further, by performing the pre-welding by the first welding step under the aforesaid conditions, it is possible to secure the nugget diameter to obtain sufficient joint strength while suppressing the generation of the indentations.

Second Embodiment

A second embodiment of the spot welding method of the high-strength steel sheets according to the present invention will be hereinafter described. Note that, in the second embodiment, its structure is described with reference to the same drawings as those in the above-described first embodiment, and the same structures will be denoted by the same reference signs and detailed description thereof will be omitted.

The spot welding method of the high-strength steel sheets of the second embodiment is a method of welding two steel sheets 1A, 1B or three steel sheets 1A to 1C by resistance spot welding as in the first embodiment, but is different from that of the above-described first embodiment in that, when at least one of gaps in the stacked steel sheets before the spot welding (hereinafter, simply referred to as the gaps) is 0.5 (mm) or more, a pressurizing force of electrodes 2A, 2B in a second welding step is changed from their pressurizing force in a first welding step.

In the second embodiment, the spot welding includes: the first welding step being pre-welding with a pressurizing force P1 (kN) and a welding current I1 (kA); and the second welding step being main welding with a pressurizing force P2 (kN) and a welding current I2 (kA).

The pressurizing forces P1, P2 are set within ranges expressed by the following expression (2), expression (3), where t (mm) is an average sheet thickness of the plural steel sheets 1.

$$0.5 \leq P2 \leq 3.0 t^{(1/3)} \quad (2)$$

$$1.0 \times P2 < P1 \leq 2.0 \times P2 \quad (3)$$

Further, the welding current I1 is set within a range of 30 to 90% of the welding current I2.

Further, the second welding step is started within 0.1 (s) after the first welding step is finished.

Generally, in the welding of a vehicle body and so on of an automobile, gaps sometimes exist between steel sheets, and a large gap over 0.5 (mm) sometimes exists. In order to fill such a large gap, in the first welding step being the pre-welding, the high-strength steel sheets 1 are first pressed with the higher pressurizing force P1 than that of the second welding step being the main welding, concretely, with the pressurizing force P1 larger than 1.0 times of the pressurizing force P2 of the second welding step and equal to or smaller than 2.0 times of the pressurizing force P2. The welding current is set to the same condition as the welding current I1 (kA) of the first welding step described in the above-described first embodiment. In the second embodiment, by first performing the pre-welding of the first welding step under the aforesaid conditions, a sufficient contact area is secured between the steel sheets 1 between which gaps exist, and between the electrodes 2A, 2B and the steel sheets 1.

Then, in the second welding step, the main welding is performed with the same pressurizing force as the pressurizing force P of the above-described first embodiment, that is, with the pressurizing force P2 within the range expressed by the following expression $\{0.5 \leq P2 \leq 3.0 t^{(1/3)}\}$ and with the welding current I2 that is the same condition as above. As described above, in the second embodiment, the conditions of the second welding step are stipulated to the same conditions as those of the above-described first embodiment. The second embodiment adopts the method of performing the second welding step after the pre-welding in the first welding step is performed with the higher pressurizing force P1 as described above. Consequently, the contact area between the electrodes 2A, 2B and the steel sheets 1 is sufficiently secured in the first welding step, and while the occurrence of expulsion is suppressed in the subsequent second welding step, base metal is sufficiently melted in this second welding step and the contact area can be sufficiently secured.

Concretely, as illustrated in the graph in FIG. 4, a welding pattern of the second embodiment is the same as the welding pattern of the above-described first embodiment. Then, as illustrated in the graph in FIG. 4, a pressurizing force pattern is adopted in which, in the first welding step and a welding suspension time, the pressurizing force by the electrodes 2A, 2B is set to the higher pressurizing force P1 than the pressurizing force P2 of the subsequent second welding step.

Here, when the pressurizing force P1 in the first welding step is less than the lower limit stipulated by the above expression (3), that is, equal to or less than 1.0 times of the pressurizing force P2 of the second welding step, the aforesaid effect of securing the contact area between the steel sheets 1 between which the gaps exist is difficult to obtain. Further, when the pressurizing force P1 is over the upper limit stipulated by the above expression (3), that is, over 2.0 times of the pressurizing force P2 of the second welding step, a current density lowers due to too high a pressurizing force in addition to the low welding current I1 of the first welding step, and temperature does not increase sufficiently, so that the securing of the contact area between the electrodes 2A, 2B and the steel sheets 1 and the securing of the contact area between the steel sheets 1, which are the objects of the first welding step, sometime become insufficient.

Further, setting the pressurizing force P2 in the second welding step within the range expressed by the above expression (2) makes the base metal sufficiently melt in the second welding step, making it possible to secure the contact area and a nugget diameter. Incidentally, when the pressurizing force P2 in the second welding step falls out of the range stipulated by the above expression (2), the same problems as those described in the above-described first embodiment are liable to occur.

Incidentally, it is described that the size of the gap between the steel sheets 1 is 0.5 (mm) or more, and this is about the same size as that of an ordinary gap occurring in an assembling process of a vehicle body and the like of an automobile. Further, an upper limit of the gap between the steel sheets 1 is not particularly limited, but the largest value of the gap occurring in the above process is generally about 2.0 (mm). Incidentally, when the gap between the steel sheets 1 is less than 0.5 (mm), by applying the conditions in the above-described first embodiment, it is possible to obtain a sufficient effect of improving joint strength.

According to the second embodiment, when at least one of the gaps in the steel sheets 1 is 0.5 (mm) or more in the examples illustrated in FIG. 1 and FIG. 2, by making the pressurizing force of the electrodes 2A, 2B different between the first welding step and the second welding step under the above-described conditions, it is possible to secure the sufficient joint area while effectively suppressing the generation of an indentation, and therefore excellent joint strength is obtained. Further, by performing the spot welding under the aforesaid conditions, it is possible to effectively prevent the occurrence of expulsion at the time of the welding, which makes it possible to obtain a spot-welded joint excellent in joint strength with good workability.

Third Embodiment

A third embodiment of the spot welding method of the high-strength steel sheets according to the present invention will be hereinafter described. Note that, in the third embodiment, its structure is described with reference to the same drawings as those in the above-described first and second embodiments, and the same structures will be denoted by the same reference signs and detailed description thereof will be omitted.

The spot welding method of the high-strength steel sheets of the third embodiment is different from those of the above-described first and second embodiments in that, in obtaining a spot-welded joint 10, it has a third welding step under the following conditions after a second welding step being main welding is finished.

Concretely, the third welding step being post-welding is provided in the method described in the above first embodiment or second embodiment, after the second welding step being the main welding. In this third welding step, a welding current is represented by I3 (kA), a welding time is represented by T3 (s), and a non-welding time between the second welding step and the third welding step is represented by TC (s), and the welding current I3 is set within a range of not less than 3 (kA) nor more than 15 (kA) (hereinafter, written as 3 to 15 (kA)).

Further, the non-welding time TC is set within a range of not less than 0 (s) nor more than 0.2 (s) (hereinafter, written as 0 to 0.2 (s)).

Further, a relation between the welding current I3 and the aforesaid welding time T3 is set within a range expressed by the following expression (4).

$$I3 \times T3 \leq 0.7 + TC \quad (4)$$

"Pressurizing Forces of Electrodes"

Pressuring forces of electrodes 2A, 2B can be the same as that of the pattern (pressurizing force P) in the above-described first embodiment or those of the pattern (pressurizing forces P1, P2) in the second embodiment. Further, in adopting these patterns of the pressurizing forces, a pressurizing force in the third welding step can be the same as the pressurizing force in the previous second welding step, that is, can be the same pressurizing force as the pressurizing force P in the first embodiment or the pressuring force P2 in the second embodiment.

Figure 5:
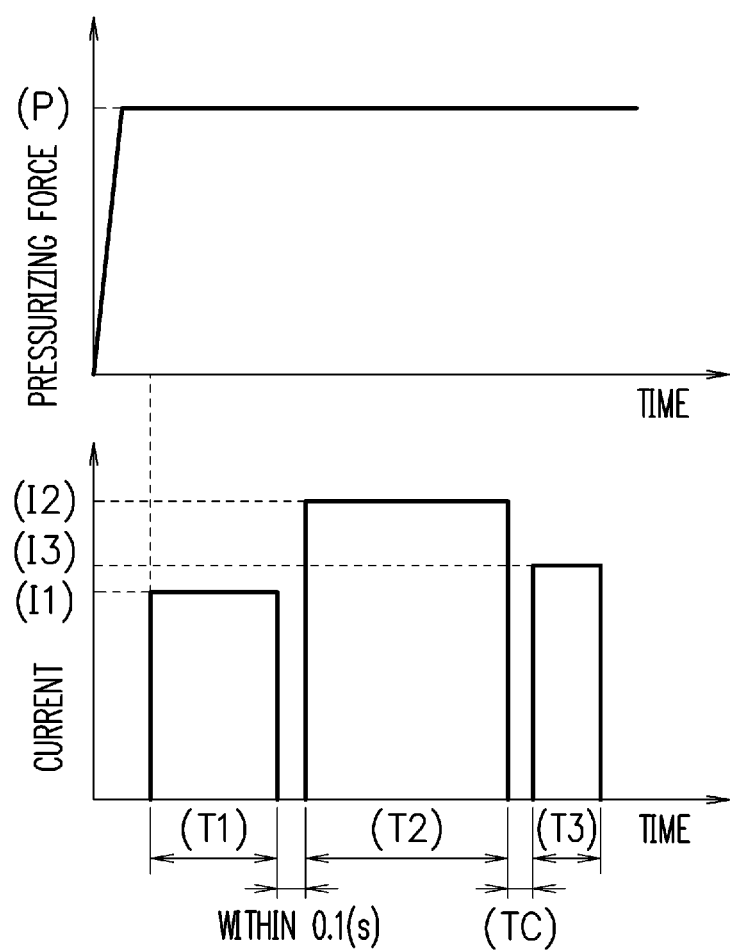
FIG. 5 is a graph illustrating an example of a pressurizing force and a welding pattern when a weld metal zone is formed by a resistance spot welding method in a third embodiment.

The graph in FIG. 5 illustrates a relation between the welding pattern and the pressurizing force pattern in the third embodiment. In the example illustrated in FIG. 5, the pressurizing force pattern is the same as the pattern in the above-described first embodiment, that is, the pressurizing force is set to the fixed pressurizing force P in the first welding step, the welding suspension time, and the second welding step, and in addition, the pressurizing force is also set to the fixed pressurizing force P in the non-welding time and the third welding step. Then, as illustrated in FIG. 5, the pattern in the first welding step, the welding suspension time, and the second welding time is the same as in the first embodiment and the second embodiment, and thereafter the non-welding time (TC) and the third welding step are provided.

"Third Welding Step (Post-welding)"

By providing the third welding step (post-welding) under the above-described conditions in addition to the first welding step (pre-welding) and the second welding step (main welding), it is possible to noticeably obtain the effect of improving joint strength by the multi-stage welding. Such conditions of the post-welding have a great influence on structures of a weld metal zone and a heat-affected zone and a segregation state. In the third embodiment, the conditions of the third welding step being the post-welding are stipulated to the conditions described in detail below.

(Welding Current: I3)

In the third welding step, first, the welding current I3 is stipulated within a range of 3 to 15 (kA). This welding current I3 has an especially great influence on the structures of the weld metal zone and the heat-affected zone and the segregation state. By setting the welding current I3 in the third welding step within this range, it is possible to more noticeably obtain the effect of improving joint strength by the multi-stage welding.

When the welding current I3 in the third welding step is less than 3 (kA), it is difficult to obtain the effect of improving joint strength by the post-welding, and when it is over 15 (kA), expulsion is likely to occur, which reduces the aforesaid effect.

(Non-Welding Time Between Second Welding Step and Third Welding Step: TC)

In the third welding step, the non-welding time TC between the second welding step and the third welding step is set within a range of 0 to 0.2 (s), that is, it is set to a condition so that the third welding step is started immediately after the second welding step is finished or the third welding step is started within 0.2 (s) after the second welding step is finished.

By stipulating the non-welding time TC within the aforesaid range, it is possible to more noticeably obtain the effect of improving joint strength by the post-welding. Here, when the non-welding time TC in the third welding step is over 0.2 (s), the process time becomes long, which not only lowers productivity but also is liable to reduce the effect of improving joint strength by the post-welding.

Note that, though the third embodiment describes the pattern where, after the second welding step is finished, the third welding step is started immediately or the third welding step is started within a predetermined time, this is not restrictive. For example, the pattern between the second welding step and the third welding step can be a down-slope pattern in which the current is gradually reduced.

(Relation Between Welding Current I3 and Welding Time T3)

In the third welding step, the relation between the welding current I3 and the welding time T3 is stipulated within the range satisfying the relation expressed by the following expression {I3×T3≤0.7+TC}, that is, a range of a value obtained by multiplying the welding current I3 and the welding time T3 is stipulated based on the aforesaid non-welding time TC.

Here, a range of an absolute value of the welding time T3 (s) in the third welding step is not particularly limited, but is determined by a calculation value obtained by multiplying this and the aforesaid welding current I3. Further, this welding time T3, similarly to the welding current I3, has an especially great influence on the structures of the weld metal and the heat-affected zone and the segregation state.

When the value of the welding current I3 multiplied by the welding time T3 is over a value calculated by the following expression {0.7+TC}, expulsion is likely to occur, which reduces the effect of improving joint strength by the post-welding. Further, a lower limit of the value of the welding current I3 multiplied by the welding time T3 is not particularly provided, but is more preferably a value obtained by the following expression {0.2+TC} or more because the effect of improving joint strength becomes noticeable.

In the third embodiment, the third welding step being the post-welding is further provided in addition to the conditions described in the first and second embodiments as described above, which makes it possible to more improve joint strength. Further, the value obtained by multiplying the welding current I3 and the welding time T3 in the third welding step is used as an index and this value is optimally stipulated within the aforesaid range, which makes it possible to obtain the effect of further improving joint strength. A reason why such an effect of improving joint strength is obtained by the third welding is not necessarily clear, but it is inferred that the alleviation of local softening and microsegregation progresses and accordingly ductility and toughness are improved.

As described above, when the steel sheets 1 are welded by the spot welding method, by setting the pressurizing force P of the electrodes 2A, 2B within the proper range according to the average sheet thickness t of the steel sheets 1 and further optimally controlling the welding pattern including the first welding step (pre-welding) and the second welding step (main welding), it is possible to secure the nugget diameter and prevent the occurrence of expulsion while suppressing the generation of indentations. Consequently, it is possible to form the spot-welded joint 10 high in reliability and excellent in joint strength while maintaining good workability.

Further, by setting the pressurizing force P1 in the first welding step being the pre-welding higher than the pressurizing force P2 in the second welding step being the main welding, even when at least one of the gaps in the steel sheets 1 is 0.5 (mm) or more, it is possible to fill the gap, secure the contact area, secure a sufficient joint area, and effectively prevent the occurrence of expulsion at the time of the welding. Consequently, it is possible to obtain the spot-welded joint 10 excellent in joint strength with good workability.

Further, by providing the third welding step being the post-welding in which the non-welding time TC, the welding current I3, and the welding time T3 are optimized, it is possible to obtain the spot-welded joint 10 whose joint strength is further improved.

Therefore, for example, in processes of manufacturing automobile parts, assembling a vehicle body, and so on, it is possible to fully enjoy merits such as fuel efficiency improvement and an emission reduction of carbon dioxide gas ($CO_2$) owing to a weight reduction of the whole vehicle body, and their social contribution is immeasurable.

Examples

Hereinafter, the present invention will be more concretely described, by presenting examples of the spot welding method of the high-strength steel sheets according to the present invention. However, the present invention is not of course limited to the examples described below, and may be implemented by being appropriately changed within the range conformable to the spirits described previously and later, and these changes are all included in the technical scope of the present invention.

Example 1

An example 1 is to verify the first embodiment.

By using steel sheets each with a sheet thickness and of a steel type shown in FIG. 7, test pieces for structure observation with 40×40 (mm) were fabricated. Among the steel types presented in FIG. 7, CR1470HP and CR1780HP represent hot-pressed (hot-stamped) steel sheets disclosed in Japanese Laid-open Patent Publication No. 2000-234153 and so on. GA1180Y represents a product conforming to the Japan Iron and Steel Federation Standard (JAC980Y). CR980Y and CR270D represent JSC980Y and JSC270D respectively which are products conforming to the Japan Iron and Steel Federation Standard. Note that CR means a cold-rolled steel sheet and GA means an alloyed galvanized steel sheet.

Further, cross tensile test pieces were fabricated based on the cross tensile testing method of a resistance spot-welded joint (JIS Z3137).

Next, two sheets or three sheets of the aforesaid test pieces for structure observation were stacked in the combination of the same steel type or different steel types and were welded by a resistance spot welding method under the conditions presented in FIG. 7, whereby welding test pieces were fabricated. At this time, the presence/absence of the occurrence of expulsion from each weld was visually confirmed.

Then, microstructures of their cross sections were observed by using an optical microscope and a nugget diameter was measured.

Further, regarding an indentation generated on a surface of each high-strength steel sheet, its depth was measured in the cross section of the weld.

Figure 6A:
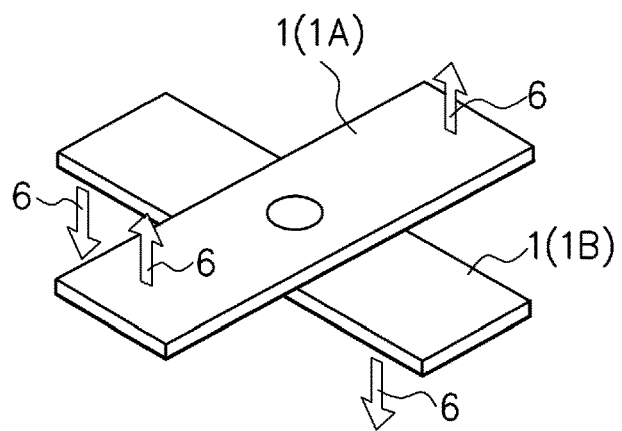
FIG. 6A is a rough view illustrating a method of measuring cross tensile strength.
Figure 6B:
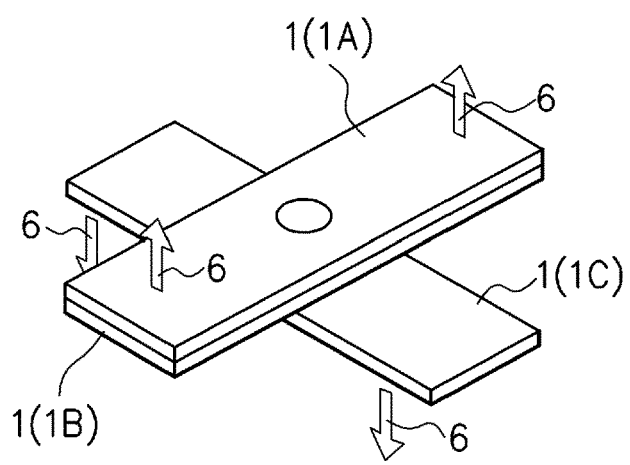
FIG. 6B is a rough view illustrating a method of measuring cross tensile strength.

Further, by using the aforesaid cross tensile test pieces, the test pieces were stacked in the shape of a cross as illustrated in FIG. 6A and FIG. 6B based on the cross tensile testing method of the resistance spot-welded joint (JIS Z3137) and were spot-welded under the conditions presented in FIG. 7, whereby cross tensile test pieces were fabricated. Note that three sets of cross tensile test pieces were fabricated under the same condition.

Then, the cross tensile test was executed by applying loads in peeling directions, that is, applying a load in an upward direction to the lower test piece and a load in a downward direction to the lower test piece as indicated by the reference number 6 in FIG. 6A and FIG. 6B so that they peel from each other, and then cross tensile strength (CTS) was measured. Here, when high-strength steel sheets are stacked and spot-welded, it can be generally said that CTS is sufficient if cross tensile strength is 2.5 (kN) or more when a sheet thickness t of the thinnest steel sheet is 0.7 (mm). Similarly, it can be said that CTS is sufficient if cross tensile strength is 5 (kN), 9 (kN), and 11 (kN) or more when the sheet thickness t of the thinnest steel sheet is 1.0 (mm), 1.6 (mm), and 2.0 (mm) respectively.

By the above-described procedure, the resistance spot welding was performed under the welding conditions within the ranges described in the first embodiment, and various tests were conducted by the above-described methods (refer to the present invention examples in FIG. 7).

Further, by the above-described procedure, the resistance spot welding was conducted under welding conditions falling out of the ranges described in the first embodiment, and various tests were conducted by the above-described methods (refer to comparative examples in FIG. 7).

FIG. 7 presents a list of fabrication conditions and test results of the respective test pieces. The example 1 is to verify the first embodiment, and in each condition number, the pressurizing forces P1, P2 are set to the same numerical value (pressurizing force P).

The condition numbers 1 to 5 are examples where two or three sheets of CR1470HP each with a 1.0 (mm) sheet thickness were stacked and spot-welded. Among these, the condition numbers 2 to 4 are the present invention examples where the spot welding was performed under the spot welding conditions within the ranges described in the first embodiment. The condition number 4 is an example where the three high-strength steel sheets were stacked and spot-welded. On the other hand, the condition numbers 1, 5 are the comparative examples where the spot welding was performed under a spot welding condition falling out of the range described in the first embodiment.

Concretely, the pressurizing force P=P1=P2 falls out of the range expressed by the above expression (1).

The condition numbers 6 to 8 are examples where two sheets of GA1180Y each with a 2.0 (mm) sheet thickness were stacked and spot-welded. Among these, the condition number 7 is the present invention example where the spot welding was performed under the spot welding conditions within the ranges described in the first embodiment. On the other hand, the condition numbers 6, 8 are the comparative examples where the spot welding was performed under a spot welding condition falling out of the range described in the first embodiment. Concretely, the pressurizing force P=P1=P2 falls out of the range expressed by the above expression (1).

The condition numbers 9 to 11 are examples where two sheets of CR1780HP each with a 1.0 (mm) sheet thickness were stacked and spot-welded. Among these, the condition number 10 is the present invention example where the spot welding was performed under the spot welding conditions within the ranges described in the first embodiment. On the other hand, the condition numbers 9, 11 are the comparative examples where the spot welding was performed under a spot welding condition falling out of the range described in the first embodiment. Concretely, these conditions fall out of the condition that the welding current I1 is set to the range of 30 to 90% of the welding current I2.

The condition numbers 12 to 14 are examples where two sheets of CR980Y each with a 0.7 (mm) sheet thickness were stacked and spot-welded. Among these, the condition number 13 is the present invention example where the spot welding was performed under the spot welding conditions within the ranges described in the first embodiment. On the other hand, the condition numbers 12, 14 are the comparative examples where the spot welding was performed under a spot welding condition falling out of the range described in the first embodiment. Concretely, the pressurizing force P=P1=P2 falls out of the range expressed by the above expression (1).

Further, the condition number 15 is an example where two sheets which were CR980Y with a 0.7 (mm) sheet thickness and CR980Y with a 4.0 (mm) sheet thickness were stacked and spot-welded, but joining itself was not possible because of too large a sheet thickness difference.

The condition numbers 16 to 18 are examples where two sheets of CR980Y each with a 1.6 (mm) sheet thickness and one sheet of CR270D with a 0.7 (mm) sheet thickness on an outer side thereof were stacked and spot-welded. Among these, the condition number 17 is the present invention example where the spot welding was performed under the spot welding conditions within the ranges described in the first embodiment.

On the other hand, the condition numbers 16, 18 are the comparative examples where the spot welding was performed under a spot welding condition falling out of the range described in the first embodiment. Concretely, the pressurizing force P=P1=P2 falls out of the range expressed by the above expression (1).

As is seen in the results in FIG. 7, it could be confirmed that, in the present invention examples of the condition numbers 2, 3, 4, 7, 10, 13, 17, when any of the steel types was used, a depth of the indentation was suppressed to 0.2 (mm) at the largest and a 4.2 (mm) nugget diameter or more could also be secured in all of them. Further, in the present invention examples, the cross tensile strength (CTS) by the cross tensile test was 2.5 (kN) or more when the sheet thickness t was 0.7 (mm), 5.0 (kN) or more when the sheet thickness t was 1 (mm), 10 (kN) or more when the sheet thickness t was 1.6 (mm), and 11 (kN) or more when the sheet thickness t was 2.0 (mm), and it became clear that they were excellent in joint strength. Further, in the present invention examples, it could be visually confirmed that no expulsion occurred at the time of the spot welding.

On the other hand, in the comparative examples of the condition numbers 1, 5, 6, 8, 9, 11, 12, 14, 16, 18, the tendency that the depth of the indentation became large and on the other hand the nugget diameter became small was confirmed. Further, it became clear that, in the comparative examples, the cross tensile strength (CTS) was low as compared with the above-described present invention examples, and thus joint strength was inferior.

Incidentally, in the condition numbers 16 to 18, as the nugget diameter, a nugget diameter on an interface between the sheets of CR980Y being the high-strength steel sheets was measured. Further, as the cross tensile strength (CTS), a value when the sheets of CR980Y were pulled so as to separate from each other, that is, strength of a weld between the sheets of CR980Y was measured.

In the comparative example of the condition number 1, since the pressurizing force P was 0.4 (kN), which is lower than the range stipulated in the first embodiment, the nugget diameter was small, namely 3.1 (mm), and the depth of the indentation was large, namely 0.4 (mm), as compared with the present invention examples 2, 3. Accordingly, in the condition number 1, the cross tensile strength was 2.1 (kN) and thus joint strength was low. Further, in the condition number 1, it was visually confirmed that the expulsion occurred at the time of the spot welding because the pressurizing force P was low.

Further, in the comparative example of the condition number 5, since the pressurizing force P was 4.0 (kN), which is over the range stipulated in the first embodiment, the depth of the indentation was large, namely 0.3 (mm) even though the nugget diameter was sufficient, namely 5.3 (mm), as compared with the present invention examples 2, 3. Accordingly, in the condition number 5, the cross tensile strength was 3.5 (kN) and thus joint strength was low.

Further, in the comparative example of the condition number 6, since the pressurizing force P was 0.4 (kN), which is below the range stipulated in the first embodiment, the nugget diameter was small, namely 5.5 (mm), and the depth of the indentation was large, namely 0.3 (mm), as compared with the present invention example 7. Accordingly, in the condition number 6, the cross tensile strength was 7.0 (kN) and thus joint strength was low. Further, in the condition number 6, the occurrence of the expulsion was confirmed.

Further, in the comparative example of the condition number 8, since the pressurizing force P was 4.5 (kN), which is over the range stipulated in the first embodiment, the depth of the indentation was large, namely 0.3 (mm) even though the nugget diameter was sufficient, namely 6.7 (mm), as compared with the present invention example 7. Accordingly, in the condition number 8, the cross tensile strength was 6.2 (kN) and thus joint strength was low.

Further, in the comparative example of the condition number 9, since the welding current I1 was less than 30% of the welding current I2, the nugget diameter was small, namely 4.4 (mm), and the depth of the indentation was large, namely 0.3 (mm), as compared with the present invention example 10. Accordingly, in the condition number 9, the cross tensile strength was 4.1 (kN) and thus joint strength was low. Further, in the condition number 9, the occurrence of the expulsion was confirmed.

Further, in the comparative example of the condition number 11, since the welding current I1 was more than 90% of the welding current I2, the depth of the indentation was large, namely 0.3 (mm) even though the nugget diameter was sufficient, namely 4.9 (mm), as compared with the present invention example 10. Accordingly, in the condition number 11, the cross tensile strength was 4.2 (kN) and thus joint strength was low.

Further, in the comparative example of the condition number 12, since the pressurizing force P was 0.4 (kN), which is below the range stipulated in the first embodiment, the nugget diameter was small, namely 3.3 (mm), and the depth of the indentation was large, namely 0.3 (mm), as compared with the present invention example 13. Accordingly, in the condition number 12, the cross tensile strength was 2.0 (kN) and thus joint strength was low. Further, in the condition number 12, the occurrence of the expulsion was confirmed.

Further, in the comparative example of the condition number 14, since the pressurizing force P was 3.5 (kN), which is over the range stipulated in the first embodiment, the depth of the indentation was large, namely 0.2 (mm) even though the nugget diameter was sufficient, namely 4.4 (mm), as compared with the present invention example 13. Accordingly, in the condition number 14, the cross tensile strength was 1.9 (kN) and thus joint strength was low.

Further, in the comparative example of the condition number 16, since the pressurizing force P was 0.3 (kN), which is below the range stipulated in the first embodiment, the nugget diameter was small, namely 5.2 (mm), and the depth of the indentation was large, namely 0.3 (mm), as compared with the present invention example 17. Accordingly, in the condition number 16, the cross tensile strength was 6.8 (kN) and thus joint strength was low. Further, in the condition number 16, the occurrence of the expulsion was confirmed.

Further, in the comparative example of the condition number 18, since the pressurizing force P was 5.0 (kN), which is over the range stipulated in the first embodiment, the depth of the indentation was large, namely 0.3 (mm) even though the nugget diameter was sufficient, namely 6.4 (mm), as compared with the present invention example 17. Accordingly, in the condition number 18, the cross tensile strength was 7.3 (kN) and thus joint strength was low.

Example 2

Figure 11A:
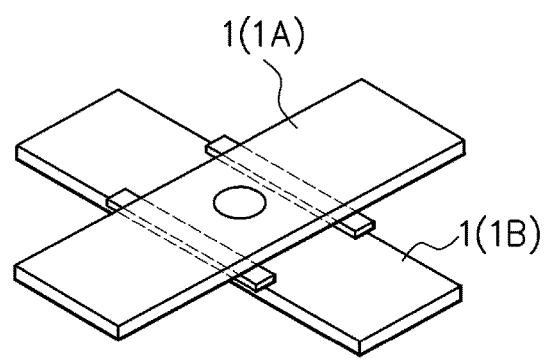
FIG. 11A is a rough view illustrating a state where spacer steel sheets are used in a method of measuring cross tensile strength.
Figure 11B:
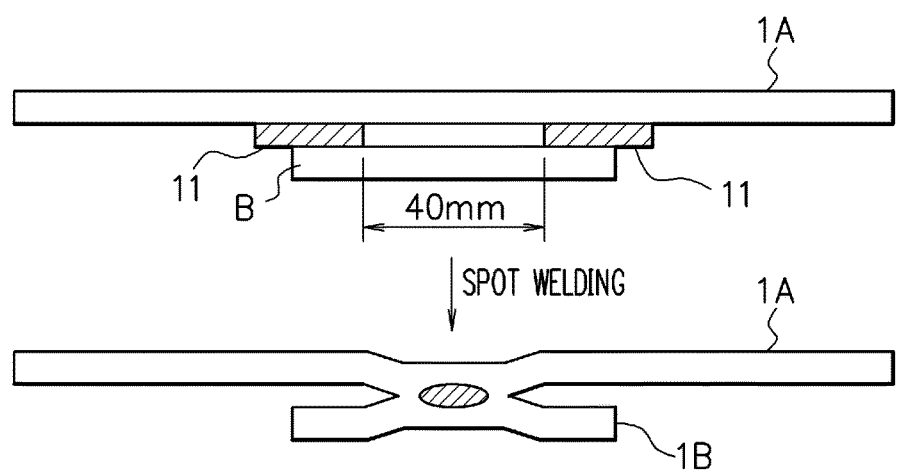
FIG. 11B is a rough view illustrating the state where spacer steel sheets are used in the method of measuring cross tensile strength.

An example 2 is to verify the second embodiment.
By using steel sheets each with a sheet thickness and of a steel type shown in FIG. 8, test pieces for structure observation and cross tensile test pieces were fabricated by the same procedure as in the example 1, and various tests were conducted by the same methods. Note that a gap between the stacked steel sheets 1 was set by spacer steel sheets with a sheet thickness corresponding to a predetermined gap being sandwiched between the steel sheets 1 whose welding was to be evaluated. Concretely, as illustrated in FIG. 11A and FIG. 11B, spacer steel sheets 11 were disposed at a 40 mm interval on both outer sides of a weld which was to be evaluated, thereby securing the predetermined gap between the steel sheets 1.

FIG. 8 presents a list of fabrication conditions and test results of the respective test pieces. The example 2 is to verify the second embodiment, and the pressurizing force P1 in the first welding step (pre-welding) and the pressurizing force P2 in the second welding step (main welding) were set to different numerical values.

Condition numbers 21 to 26 are examples where two or three sheets of CR1470HP each with a 1.0 (mm) sheet thickness were stacked and spot-welded. Among these, the condition numbers 22, 25 are present invention examples where the spot welding was performed under the spot welding conditions within the ranges described in the second embodiment. On the other hand, the condition numbers 21, 23, 24, 26 are comparative examples where the spot welding was performed under a spot welding condition falling out of the range described in the second embodiment. Concretely, the relation between the pressurizing forces P1, P2 falls out of the range expressed by the above expression (3).

Condition numbers 27 to 29 are examples where two sheets of GA1180Y each with a 2.0 (mm) sheet thickness were stacked and spot-welded. Among these, the condition number 28 is a present invention example where the spot welding was performed under the spot welding conditions within the ranges described in the second embodiment. On the other hand, the condition numbers 27, 29 are comparative examples where the spot welding was performed under a spot welding condition falling out of the range described in the second embodiment. Concretely, the relation between the pressurizing forces P1, P2 falls out of the range expressed by the above expression (3).

Condition numbers 30 to 32 are examples where two sheets of CR1780HP each with a 1.0 (mm) sheet thickness were stacked and spot-welded. Among these, the condition number 31 is a present invention example where the spot welding was performed under the spot welding conditions within the ranges described in the second embodiment. On the other hand, the condition numbers 30, 32 are comparative examples where the spot welding was performed under a spot welding condition falling out of the range described in the second embodiment. Concretely, the relation between the pressurizing forces P1, P2 falls out of the range expressed by the above expression (3).

Condition numbers 33 to 35 are examples where two sheets of CR980Y each with a 0.7 (mm) sheet thickness were stacked and spot-welded. Among these, the condition number 34 is a present invention example where the spot welding was performed under the spot welding conditions within the ranges described in the second embodiment. On the other hand, the condition numbers 33, 35 are comparative examples where the spot welding was performed under a spot welding condition falling out of the range described in the second embodiment. Concretely, the relation between the pressurizing forces P1, P2 falls out of the range expressed by the above expression (3).

Condition numbers 36 to 38 are examples where two sheets of CR980Y each with a 1.6 (mm) sheet thickness and one sheet of CR270D with a 0.7 (mm) sheet thickness on an outer side thereof were stacked and spot-welded. Among these, the condition number 37 is a present invention example where the spot welding was performed under the spot welding conditions within the ranges described in the second embodiment. On the other hand, the condition numbers 36, 38 are comparative examples where the spot welding was performed under a spot welding condition falling out of the range described in the second embodiment. Concretely, the relation between the pressurizing forces P1, P2 falls out of the range expressed by the above expression (3).

As is seen in the results in FIG. 8, it could be confirmed that, in the present invention examples of the condition numbers 22, 25, 28, 31, 34, 37, when any of the steel types was used, the depth of the indentation was suppressed to 0.2 (mm) at the largest and a 4.2 (mm) nugget diameter or more could be secured in all of them. Further, in the present invention examples, the cross tensile strength (CTS) by the cross tensile test was 2.5 (kN) or more when the sheet thickness t was 0.7 (mm), 5.0 (kN) or more when the sheet thickness t was 1 (mm), 10 (kN) or more when the sheet thickness t was 1.6 (mm), and 11 (kN) or more when the sheet thickness t was 2.0 (mm), and it became clear that they were excellent in joint strength. Further, in the present invention examples, it could be visually confirmed that no expulsion occurred at the time of the spot welding.

On the other hand, in the comparative examples of the condition numbers 21, 23, 24, 26, 27, 29, 30, 32, 33, 35, 36, 38, the tendency that the depth of the indentation became large and on the other hand the nugget diameter became small was confirmed. Further, it became clear that, in the comparative examples, the cross tensile strength (CTS) was low as compared with the above-described present invention examples, and thus joint strength was inferior.

Incidentally, in the condition numbers 36 to 38, as the nugget diameter, a nugget diameter on an interface between the sheets of CR980Y being high-strength steel sheets was measured. Further, as the cross tensile strength (CTS), a value when the sheets of CR980Y were pulled so as to separate from each other, that is, strength of a weld between the sheets of CR980Y was measured.

In the comparative example of the condition number 21, since the pressurizing force ratio P1/P2 was 1.0, which is below the range described in the second embodiment, the nugget diameter was small, namely 3.2 (mm), and the depth of the indentation was large, namely 0.3 (mm), as compared with the present invention example 22. Accordingly, in the condition number 21, the cross tensile strength was 2.4 (kN) and thus joint strength was low. Further, in the condition number 21, the occurrence of the expulsion was confirmed.

Further, in the comparative example of the condition number 23, since the pressurizing force ratio P1/P2 was 2.4, which is over the range described in the second embodiment, the nugget diameter was small, namely 4.7 (mm), and the depth of the indentation was large, namely 0.2 (mm), as compared with the present invention example 22. Accordingly, in the condition number 23, the cross tensile strength was 4.2 (kN) and thus joint strength was low. Further, in the condition number 23, the occurrence of the expulsion was confirmed.

In the comparative example of the condition number 24, since the pressurizing force ratio P1/P2 was 1.0, which is below the range described in the second embodiment, the nugget diameter was small, namely 3.0 (mm), and the depth of the indentation was large, namely 0.4 (mm), as compared with the present invention example 25. Accordingly, in the condition number 24, the cross tensile strength was 3.6 (kN) and thus joint strength was low. Further, in the condition number 24, the occurrence of the expulsion was confirmed.

In the comparative example of the condition number 26, since the pressurizing force ratio P1/P2 was 2.2, which is over the range described in the second embodiment, the nugget diameter was small, namely 4.3 (mm), and the depth of the indentation was large, namely 0.4 (mm), as compared with the present invention example 25. Accordingly, in the condition number 26, the cross tensile strength was 3.7 (kN) and thus joint strength was low. Further, in the condition number 26, the occurrence of the expulsion was confirmed.

In the comparative example of the condition number 27, since the pressurizing force ratio P1/P2 was 1.0, which is below the range described in the second embodiment, the nugget diameter was small, namely 3.7 (mm), and the depth of the indentation was large, namely 0.4 (mm), as compared with the present invention example 28. Accordingly, in the condition number 27, the cross tensile strength was 5.5 (kN) and thus joint strength was low. Further, in the condition number 27, the occurrence of the expulsion was confirmed.

Further, in the comparative example of the condition number 29, since the pressurizing force ratio P1/P2 was 2.7, which is over the range described in the second embodiment, the nugget diameter was small, namely 5.0 (mm), and the depth of the indentation was large, namely 0.4 (mm), as compared with the present invention example 28. Accordingly, in the condition number 29, the cross tensile strength was 7.5 (kN) and thus joint strength was low. Further, in the condition number 29, the occurrence of the expulsion was confirmed.

In the comparative example of the condition number 30, since the pressurizing force ratio P1/P2 was 1.0, which is lower than the range described in the second embodiment, the nugget diameter was small, namely 3.9 (mm), and the depth of the indentation was large, namely 0.4 (mm), as compared with the present invention example 31. Accordingly, in the condition number 30, the cross tensile strength was 4.1 (kN) and thus joint strength was low. Further, in the condition number 30, the occurrence of the expulsion was confirmed.

Further, in the comparative example of the condition number 32, since the pressurizing force ratio P1/P2 was 2.2, which is over the range described in the second embodiment, the nugget diameter was small, namely 4.7 (mm), and the depth of the indentation was large, namely 0.3 (mm), as compared with the present invention example 31. Accordingly, in the condition number 32, the cross tensile strength was 4.8 (kN) and thus joint strength was low. Further, in the condition number 32, the occurrence of the expulsion was confirmed.

In the comparative example of the condition number 33, since the pressurizing force ratio P1/P2 was 1.0, which is below the range described in the second embodiment, the nugget diameter was small, namely 3.9 (mm), and the depth of the indentation was large, namely 0.2 (mm), as compared with the present invention example 34. Accordingly, in the condition number 33, the cross tensile strength was 1.9 (kN) and thus joint strength was low. Further, in the condition number 33, the occurrence of the expulsion was confirmed.

In the comparative example of the condition number 35, since the pressurizing force ratio P1/P2 was 2.4, which is over the range described in the second embodiment, the nugget diameter was small, namely 3.5 (mm), and the depth of the indentation was large, namely 0.3 (mm), as compared with the present invention example 34. Accordingly, in the condition number 35, the cross tensile strength was 1.7 (kN)

and thus joint strength was low. Further, in the condition number 35, the occurrence of the expulsion was confirmed.

In the comparative example of the condition number 36, since the pressurizing force ratio P1/P2 was 1.0, which is below the range described in the second embodiment, the nugget diameter was small, namely 5.3 (mm), and the depth of the indentation was large, namely 0.2 (mm), as compared with the present invention example 37. Accordingly, in the condition number 36, the cross tensile strength was 6.9 (kN) and thus joint strength was low. Further, in the condition number 36, the occurrence of the expulsion was confirmed.

In the comparative example of the condition number 38, since the pressurizing force ratio P1/P2 was 2.2, which is over the range described in the second embodiment, the nugget diameter was small, namely 5.2 (mm), and the depth of the indentation was large, namely 0.2 (mm), as compared with the present invention example 37. Accordingly, in the condition number 38, the cross tensile strength was 7.2 (kN) and thus joint strength was low. Further, in the condition number 38, the occurrence of the expulsion was confirmed.

Example 3

An example 3 is to verify the case where, in the third embodiment, the third welding step being the post-welding is provided after the second welding step in the first embodiment.

By using steel sheets each with a sheet thickness and of a steel type shown in FIG. 9, test pieces for structure observation and cross tensile test pieces were fabricated by the same procedure as in the example 1, and various tests were conducted by the same methods.

FIG. 9 presents a list of fabrication conditions and test results of the respective test pieces. The example 3 is to verify the third embodiment, and in the first welding step and the second welding step, the spot welding conditions within the ranges described in the first embodiment are satisfied.

Condition numbers 41 to 45 are examples where two sheets of CR1470HP each with a 1.0 (mm) sheet thickness were stacked and spot-welded. Among these, the condition numbers 41, 42, 45 are present invention examples where the spot welding was performed under the spot welding conditions within the ranges described in the third embodiment. On the other hand, the condition numbers 43, 44 are comparative examples where the spot welding was performed under a spot welding condition falling out of the range described in the third embodiment. Concretely, the non-welding time TC, and the welding current I3 and the welding time T3 in the third welding step are changed, so that the left side—the right side in the expression (4) is over 0.

Condition numbers 46 to 49 are examples where three sheets of CR1470HP each with a 1.0 (mm) sheet thickness were stacked and spot-welded. Among these, the condition numbers 46, 47 are present invention examples where the spot welding was performed under the spot welding conditions within the ranges described in the third embodiment. On the other hand, the condition numbers 48, 49 are comparative examples where the spot welding was performed under a spot welding condition falling out of the range described in the third embodiment. Concretely, the non-welding time TC, and the welding current I3 and the welding time T3 in the third welding step are changed, so that the left side—the right side in the expression (4) is over 0.

As is seen in the results in FIG. 9, it became clear that, in the present invention examples of the condition numbers 41, 42, 45 to 47, the cross tensile strength (CTS) by the cross tensile test was high as compared with the comparative examples of the condition numbers 43, 44, 48, 49.

Further, the condition numbers 41, 42, 45 and the condition number 2 are the same conditions except for the presence/absence of the third welding step, but it became clear that, in the condition numbers 41, 42, 45, the cross tensile strength (CTS) by the cross tensile test became high as compared with the condition number 2.

Example 4

An example 4 is to verify the case where, in the third embodiment, the third welding step being the post-welding is provided after the second welding step in the second embodiment.

By using steel sheets each with a sheet thickness and of a steel type shown in FIG. 10, test pieces for structure observation and cross tensile test pieces were fabricated by the same procedure as in the example 1, and various tests were conducted by the same methods.

FIG. 10 presents a list of fabrication conditions and test results of the respective test pieces. The example 4 is to verify the third embodiment, and in the first welding step and the second welding step, the spot welding conditions within the ranges described in the second embodiment are satisfied.

Condition numbers 51 to 55 are examples where two sheets of CR1470HP each with a 1.0 (mm) sheet thickness were stacked and spot-welded. Among these, the condition numbers 51, 52, 55 are present invention examples where the spot welding was performed under the spot welding conditions within the ranges described in the third embodiment. On the other hand, the condition numbers 53, 54 are comparative examples where the spot welding was performed under a spot welding condition falling out of the range described in the third embodiment. Concretely, the non-welding time TC, and the welding current I3 and the welding time T3 in the third welding step are changed, so that the left side—the right side in the expression (4) is over 0.

Condition numbers 56 to 59 are examples where three sheets of CR1470HP each with a 1.0 (mm) sheet thickness were stacked and spot-welded. Among these, the condition numbers 56, 57 are present invention examples where the spot welding was performed under the spot welding conditions within the ranges described in the third embodiment. On the other hand, the condition numbers 58, 59 are comparative examples where the spot welding was performed under a spot welding condition falling out of the range described in the third embodiment. Concretely, the non-welding time TC, and the welding current I3 and the welding time T3 in the third welding step are changed, so that the left side—the right side in the expression (4) is over 0.

As is seen in the results in FIG. 10, it became clear that, in the present invention examples of the condition numbers 51, 52, 55 to 57, the cross tensile strength (CTS) by the cross tensile test was high as compared with the comparative examples of the condition numbers 53, 54, 58, 59.

Further, the condition numbers 51, 52, 55 and the condition number 22 are the same conditions except for the presence/absence of the third welding step, but it became clear that, in the condition numbers 51, 52, 55, the cross tensile strength (CTS) by the cross tensile test became high as compared with the condition number 22.

Similarly, the condition numbers 56, 57 and the condition number 25 are the same conditions except for the presence/ absence of the third welding step, but it became clear that, in the condition numbers 56, 57, the cross tensile strength (CTS) by the cross tensile test became high as compared with the condition number 25.

Incidentally, in the above-described examples 1 to 3, when experiments were further conducted with other steel types and with the sheet thickness being changed, and when experiments were further conducted with the plating seed, weight, and so on being changed, the results are also the same as above, and it could be confirmed that it is possible to obtain the effects of the present invention, that is, it is possible to secure the nugget diameter and prevent the occurrence of the expulsion while suppressing the occurrence of the indentation, and to form a highly reliable welded joint having sufficiently high strength.

From the above-described results of the examples, it has become clear that the use of the spot welding method of the high-strength steel sheets of the present invention makes it is possible to secure the nugget diameter and prevent the occurrence of the expulsion while suppressing the occurrence of the indentation, and the highly reliable spot-welded joint having sufficiently high strength can be obtained with good workability, when the steel sheets are welded by the resistance spot welding method.

Hitherto, the present invention has been descried together with the various embodiments, but the present invention is not limited only to these embodiments, and changes and so on can be made within the range of the present invention.

INDUSTRIAL APPLICABILITY

According to the present invention, when high-strength steel sheets used in the manufacture of automobile parts, the assembling of a vehicle body, and so on are spot-welded, it is possible to secure a nugget diameter and prevent the occurrence of expulsion while suppressing the generation of an indentation. Consequently, it is possible to obtain a highly reliable welded joint having sufficiently high strength with good workability. Therefore, merits obtained by applying the high-strength steel sheets in the automobile field and the like, such as fuel efficiency improvement and an emission reduction of carbon dioxide gas ($CO_2$) accompanying a weight reduction of the whole vehicle, can be fully enjoyed, and their social contribution is immeasurable.

The invention claimed is:

1. A method for spot welding a stack of a plurality of steel sheets, the method comprising:
providing said stack of the plurality of steel sheets, wherein said plurality of steel sheets:
are two steel sheets which both have tensile strength of not less than 780 MPa nor more than 1850 MPa and whose sheet thickness ratio={a sum of sheet thicknesses of the steel sheets}/{the sheet thickness of the thinner steel sheet (when the both have the same thickness, the sheet thickness per one sheet)} is within a range of not less than 2 nor more than 5, or
are three steel sheets which are three steel sheets all having tensile strength of not less than 780 MPa nor more than 1850 MPa or which are two steel sheets both having tensile strength of not less than 780 MPa nor more than 1850 MPa and one steel sheet provided on an outer side of the two steel sheets and having tensile strength of less than 780 MPa, and whose sheet thickness ratio={a sum of sheet thicknesses of the steel sheets}/{the sheet thickness of the thinner steel sheet (when the steel sheets all have the same thickness, the sheet thickness per one sheet)} is within a range of not less than 3 nor more than 6,
applying resistance spot welding to said stack of the plurality of steel sheets by:
a first welding step being pre-welding with a pressurizing force P1 (kN) and a welding current I1 (kA); and
a second welding step being main welding with a pressurizing force P2 (kN) and a welding current I2 (kA),
the resistance spot welding being spot welding that passes a current to an overlapping part of the steel sheets while pressing electrodes against the steel sheets from both sides,
wherein the pressurizing forces P1, P2 are set to a fixed pressurizing force P=P1=P2 all through the first welding step and the second welding step, and are set within a range expressed by the following expression (1), where t (mm) is an average sheet thickness of the plural steel sheets, $$0.5 \leq P \leq 3.0 t^{(1/3)} \tag{1},$$

wherein the welding current I1 is set within a range of not less than 30% nor more than 90% of the welding current I2, and
wherein the second welding step is started within 0.1 (s) after the first welding step is finished.

2. A method for spot welding a stack of a plurality of steel sheets, the method comprising:
providing said stack of the plurality of steel sheets, wherein said plurality of steel sheets:
are two steel sheets which both have tensile strength of not less than 780 MPa nor more than 1850 MPa and whose sheet thickness ratio={a sum of sheet thicknesses of the steel sheets}/{the sheet thickness of the thinner steel sheet (when the both have the same thickness, the sheet thickness per one sheet)} is within a range of not less than 2 nor more than 5, or
are three steel sheets which are three steel sheets all having tensile strength of not less than 780 MPa nor more than 1850 MPa or which are two steel sheets both having tensile strength of not less than 780 MPa nor more than 1850 MPa and one steel sheet provided on an outer side of the two steel sheets and having tensile strength of less than 780 MPa, and whose sheet thickness ratio={a sum of sheet thicknesses of the steel sheets}/{the sheet thickness of the thinner steel sheet (when the steel sheets all have the same thickness, the sheet thickness per one sheet)} is within a range of not less than 3 nor more than 6,
applying resistance spot welding to said stack of the plurality of steel sheets by:
a first welding step being pre-welding with a pressurizing force P1 (kN) and a welding current I1 (kA); and
a second welding step being main welding with a pressurizing force P2 (kN) and a welding current I2 (kA),
the resistance spot welding being spot welding that passes a current to an overlapping part of the steel sheets while pressing electrodes against the steel sheets from both sides,
wherein the pressurizing forces P1, P2 are set within ranges expressed by the following expression (2), expression (3), where t (mm) is an average sheet thickness of the plural steel sheets, $$0.5 \leq P2 \leq 3.0 t^{(1/3)} \tag{2}$$

$$1.0 \times P2 < P1 \leq 2.0 \times P2 \tag{3}$$

wherein the welding current I1 is set within a range of not less than 30% nor more than 90% of the welding current I2, and wherein the second welding step is started within 0.1 (s) after the first welding step is finished.

3. The method according to claim 1, wherein any gap between the stacked steel sheets before the spot welding is less than 0.5 (mm).

4. The method according to claim 2, wherein at least one of gaps between the stacked steel sheets before the spot welding is 0.5 (mm) or more.

5. The method according to claim 1, the method comprising a third welding step being post welding after the second welding step being the main welding, wherein, with a welding current and a welding time of the third welding step being represented by I3 (kA) and T3 (s) respectively, and with a non-welding time between the second welding step and the third welding step being represented by TC (s), the welding current I3 is set within a range of not less than 3 (kA) nor more than 15 (kA), the non-welding time TC is set within a range of not less than 0 (s) nor more than 0.2 (s), and a relation between the welding current I3 and the welding time T3 is set within a range expressed by the following expression (4)

$$I3 \times T3 \leq 0.7 + TC \qquad (4).$$

6. The method according to claim 2, the method comprising a third welding step being post welding after the second welding step being the main welding, wherein, with a welding current and a welding time of the third welding step being represented by I3 (kA) and T3 (s) respectively, and with a non-welding time between the second welding step and the third welding step being represented by TC (s), the welding current I3 is set within a range of not less than 3 (kA) nor more than 15 (kA), the non-welding time TC is set within a range of not less than 0 (s) nor more than 0.2 (s), and a relation between the welding current I3 and the welding time T3 is set within a range expressed by the following expression (4)

$$I3 \times T3 \leq 0.7 + TC \qquad (4).$$

7. The method according to claim 1, wherein a welding time of the second welding step is longer than a welding time of the first welding step.

8. The method according to claim 2, wherein a welding time of the second welding step is longer than a welding time of the first welding step.

9. The method according to claim 1, wherein in the second welding step, a joint area is secured by melting a base metal.

10. The method according to claim 2, wherein in the second welding step, a joint area is secured by melting a base metal.

11. The method according to claim 1, wherein:
the first welding step is pre-welding of performing preheating; and
the second welding step is main welding of, subsequently to the first welding step, forming a nugget by welding energization.

12. The method according to claim 2, wherein:
the first welding step is pre-welding of performing preheating; and
the second welding step is main welding of, subsequently to the first welding step, forming a nugget by welding energization.

* * * * *